(12) United States Patent
Rossier et al.

(10) Patent No.: US 11,968,345 B1
(45) Date of Patent: Apr. 23, 2024

(54) JUXTAPOSED CLUSTERED DISPERSED DOT HALFTONING

(71) Applicants: Romain Rossier, Vionnaz (CH); Roger D. Hersch, Epalinges (CH)

(72) Inventors: Romain Rossier, Vionnaz (CH); Roger D. Hersch, Epalinges (CH)

(73) Assignee: Innoview Sarl, Epalinges (CH)

( * ) Notice: Subject to any disclaimer, the term of this patent is extended or adjusted under 35 U.S.C. 154(b) by 0 days.

(21) Appl. No.: 18/095,546

(22) Filed: Jan. 11, 2023

(51) Int. Cl.
| | | |
|---|---|---|
| H04N 1/40 | (2006.01) |
| H04N 1/23 | (2006.01) |
| H04N 1/405 | (2006.01) |
| H04N 1/52 | (2006.01) |
| H04N 1/60 | (2006.01) |

(52) U.S. Cl.
CPC ......... *H04N 1/4055* (2013.01); *H04N 1/2346* (2013.01); *H04N 1/52* (2013.01); *H04N 1/6086* (2013.01)

(58) Field of Classification Search
CPC ...... H04N 1/4055; H04N 1/2346; H04N 1/52; H04N 1/6086
See application file for complete search history.

(56) References Cited

U.S. PATENT DOCUMENTS

| | | |
|---|---|---|
| 7,005,166 B2 | 2/2006 | Narita et al. |
| 7,054,038 B1 * | 5/2006 | Ostromoukhov ........ H04N 1/52 |
| | | 358/3.16 |
| 7,069,851 B2 | 7/2006 | Shigeta |
| 7,182,451 B2 | 2/2007 | Ausländer |
| 7,394,571 B2 * | 7/2008 | Harrington ............ H04N 1/52 |
| | | 358/2.1 |
| 7,821,675 B2 | 10/2010 | Coyle et al. |
| 8,085,438 B2 | 12/2011 | Hersch et al. |

OTHER PUBLICATIONS

Babaei et al., N-Ink Printer Characterization With Barycentric Subdivision, Jul. 7, 2016 (Year: 2016).*
V. Babaei, R.D. Hersch, Juxtaposed Color Halftoning Relying on Discrete Lines, IEEE Transaction on Image Processing, vol. 22, No. 2, Feb. 2013, pp. 679-686.

(Continued)

*Primary Examiner* — Barbara D Reinier

(57) ABSTRACT

We disclose a method for printing by rotogravure, flexography, offset, inkjet or electrophotography invisible images that are viewable under UV light. The method generates juxtaposed dispersed dot halftones by first creating juxtaposed clustered dot halftones and by applying to them dispersed dot halftoning according to a blackness reduction factor. Dispersed dot halftoning is embodied by random threshold error diffusion. The resulting dispersed dot halftones comprise pixel segments located within the areas defined by the clustered dots. These pixel segments specify the areas of the cells to be engraved onto the rotogravure cylinder. For offset, they can be imaged onto an offset plate or for electrophotography, onto a photoconductor. The disclosed juxtaposed dispersed dot halftoning method can be embedded into a framework for the reproduction of fluorescent full color images with three or more invisible fluorescent inks. These invisible fluorescent color images offer a strong protection against counterfeits.

12 Claims, 17 Drawing Sheets

(56) References Cited

OTHER PUBLICATIONS

PhD thesis by Vahid Babaei, Color Reproduction with Juxtaposed Halftoning, Chapter 2, Discrete-Line Juxtaposed Halftoning, Jan. 2015.

F. Bernardini, J. Mittleman, H. Rushmeier, C. Silva, and G. Taubin, The Ball-Pivoting Algorithm for Surface Reconstruction, IEEE Trans. Visualization and Computer Graphics, vol. 5, No. 4, pp. 349-359 (1999).

T.M. Holladay, Optimum algorithm for halftone generation for displays and hard copies, in Proceedings of SID, vol. 21 pp. 185-192 (1980).

I. Amidror, Scattered data interpolation methods for electronic imaging systems: a survey, Journal of Electronic Imaging vol. 11, No. 2, pp. 157-176, Apr. 2002.

* cited by examiner

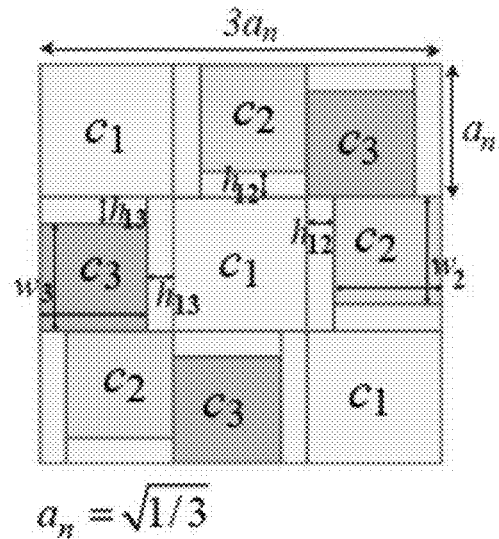

$a_n = \sqrt{1/3}$

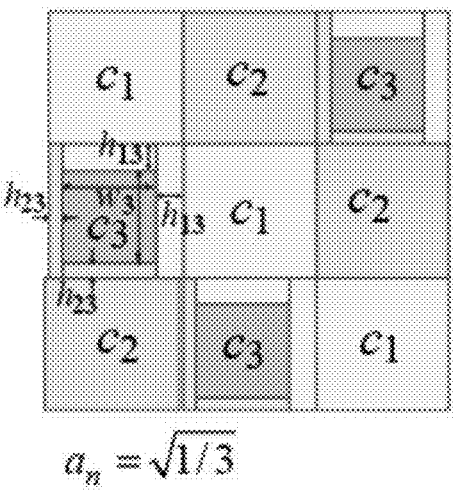

$a_n = \sqrt{1/3}$ $s'_1 > \dfrac{1}{3},\ s'_2 < \dfrac{1}{3},\ s'_3 < \dfrac{1}{3}$ (A1)

$s'_{12} = \left(s'_1 - \dfrac{1}{3}\right)\dfrac{1/3 - s'_2}{2/3 - s'_2 - s'_3}$ (A2)

$s'_{13} = \left(s'_1 - \dfrac{1}{3}\right)\dfrac{1/3 - s'_3}{2/3 - s'_2 - s'_3}$ (A3)

$w_2 = \sqrt{s'_2};\ w3 = \sqrt{s'_3}$ (A4)

$s'_{12} = \left(w_2 + \sqrt{1/3}\right) h_{12}$ (A5)

$s'_{13} = \left(w_3 + \sqrt{1/3}\right) h_{13}$ (A6)

$s'_{23} = 0$ (A7)

$s'_1 > \dfrac{1}{3},\ s'_2 > \dfrac{1}{3},\ s'_3 < \dfrac{1}{3}$ (B1)

$s'_{13} = \left(s'_1 - \dfrac{1}{3}\right)$ (B2)

$s'_{23} = \left(s'_2 - \dfrac{1}{3}\right)$ (B3)

$w_3 = \sqrt{s'_3}$ (B4)

$s'_{13} = \left(w_3 + \sqrt{1/3}\right) h_{13}$ (B5)

$s'_{23} = \left(w_3 + \sqrt{1/3}\right) h_{23}$ (B6)

JUXTAPOSED CLUSTERED DISPERSED DOT HALFTONING

BACKGROUND

The present invention relates to the field of special halftoning techniques for printing security documents. It also relates to methods and devices for authenticating documents and valuable products by full color fluorescent images that are invisible under day light and visible under ultraviolet (UV) light.

The present invention provides enabling technologies for rotogravure printing, pad printing, offset printing, ink-jet printing, electrophotography and flexography, with the purpose of counterfeit protection of banknotes, fiscal stamps, checks, credit cards, passports, identity cards, travel documents, legal documents, valuable business documents, event tickets, transportation tickets, as well as packages of goods such as medical drugs, watches, software, skincare devices, and alcoholic beverages.

The present invention also applies to domains where protective and decorative features can be combined, for example branded articles, packages and labels for luxury goods (watches, jewelry, perfumes, body care liquids, alcoholic drinks) and clothes (e.g. dresses, skirts, blouses, jackets and pants). As a further application field, the present invention also enables creating digital fluorescent color images for commercial art, decoration, publicity displays, fashion articles, and night life, where fluorescent images viewed under UV illumination in the dark have a strongly appealing effect.

A recent challenge consists in creating color images by using several fluorescent inks each having its own emission spectrum within the visible wavelength range. U.S. Pat. No. 8,085,438 "Printing color images visible under UV light on security documents and valuable articles", inventors Hersch, Donze and Chosson, filed Apr. 23, 2007, hereinafter incorporated by reference, discloses a reproduction framework for printing with invisible fluorescent inks full color images viewable only under UV light.

This prior art reproduction framework is adequate for creating fluorescent images printed on an offset printer. For offset printing, the screen dot imaged on an offset plate can have any desirable size, from a very small size to the full coverage of the screen dot. In contrast, other printing technologies such as gravure must, when creating the gravure cylinder, keep some walls between adjacent screen cells. Therefore there is a need to expand the prior art juxtaposed clustered dot halftoning method developed mainly for offset, electrophotography and ink-jet, in order to account for the constraints imposed by gravure, rotogravure, pad printing, and flexography. The new disclosed juxtaposed dispersed dot halftoning method also improves the quality of offset and ink-jet printing with fluorescent inks and of electrophotography with fluorescent solid or liquid toners.

SUMMARY

In the present invention, we propose a new juxtaposed dispersed-dot halftoning method that can be embodied by a computer program running on a computing system for creating color images, among them also color images that are visible only under UV light. This improved method is applicable to printing systems whose ink is deposited into cavities (rotogravure printing, gravure printing, pad printing), deposited on top of raised elements (flexography), deposited onto ink accepting locations of an offset plate, directly printed on a substrate (by inkjet) or transferred from the photoconductor drum of an electrophotography printer to paper. In gravure or flexographic printing systems the cavities or the raised elements need to be surrounded by boundaries. The present invention combines the advantages of juxtaposed halftoning where different colorants do not overlap with dispersed dot halftoning, which ensures that small pixel wide halftone structures (active pixel segments) are to a large extent surrounded by border structures (non-active pixels).

The disclosed juxtaposed dispersed dot halftoning method combines juxtaposed clustered dot halftoning and dispersed dot halftoning to create clusters of juxtaposed dispersed colorant dots laid out side by side and that are each one surrounded by unprinted space. Thanks to the unprinted space surrounding the clusters of dispersed halftoned dots, small misregistrations of the ink halftone separations do not lead to undesired ink overlaps of neighboring clusters of dispersed dots. In addition, thanks to the use of random threshold error-diffusion to generate the dispersed dot halftones embodied by clusters of pixel segments. Small misregistrations do not modify the overall colorant color. Furthermore, by tuning the ink level reduction factor used for dispersed dot halftoning, it is possible to control the size of the horizontal, vertical and possibly diagonal pixel segments that form the clusters of dispersed halftone dots. For rotogravure printing, these pixel segments define the areas that are engraved on the rotogravure cylinder. According to the size of these areas, more or less ink is stored in these engravings at rotogravure printing time. The quantity of stored ink that is transferred onto the print substrate (e.g. paper) determines the printed ink density.

For a rotogravure printer, the thin pixel segment structures that constitute the juxtaposed clusters of dispersed ink dots specify the locations and areas to be engraved onto the cylinder. The fact that within the clusters of dispersed dots these segment structures have sizes that do not vary strongly enables creating a very stable rotogravure, offset, inkjet or electrophotography multi-ink colorant halftoning framework relying on clusters of densely spaced pixel segments. Such a framework enables high-quality color reproduction. Although juxtaposed dispersed dot halftoning is mainly used for printing color images visible under UV light with fluorescent inks, it can be also used in other applications, for example when printing color images viewable under daylight illumination with opaque custom inks.

The method proposed for creating juxtaposed dispersed dot halftones involves in a first step the creation of juxtaposed clustered dots. Juxtaposed dispersed dots are generated by applying to the juxtaposed clustered dots a dispersed dot halftoning procedure. By construction, the juxtaposed clustered dots are surrounded by unprinted non-active space. The area of these clustered dots is a function of the surface coverages of its corresponding colorants that need to be printed. The juxtaposed dispersed dot halftone resulting from dispersed dot halftoning is formed by clusters of densely spaced pixel segments. These pixel segments are partly or fully surrounded by non-active pixels. These clusters of pixel segments cover the same area as the corresponding juxtaposed clustered dots. They are also surrounded by the same unprinted non-active space as the juxtaposed clustered dots. These pixel segments specify the locations and areas that have to be engraved in order to produce a rotogravure cylinder for rotogravure printing or a gravure plate for pad printing. Non-active pixels and non-active space specify locations without engravings. In case of offset printing, these pixel segments define the ink attracting locations and areas on the offset plate. In the case of electrophotography, they define the positions and areas where toner particles are attracted by the photoconductor. In the case of inkjet printing, they define the locations and areas of the inks on the substrate (paper).

By using an ink level reduction factor, the dispersed dot halftoning procedure can be tuned to create either longer pixel segments with less unprinted non-active space and more connections between neighboring segments or shorter pixel segments with more unprinted non-active space surrounding them and fewer connections between them. For a fluorescent color reproduction workflow, the ink level reduction factors associated to the fluorescent inks can be optimized to obtain fluorescent achromatic gray and white emission colors.

The creation of juxtaposed clustered dots comprises the steps of (a) defining the number of colorants that can be placed within one screen element, (b) selecting among the available colorants the ones to be placed within the screen element, (c) creating the layout of the screen element, (d) calculating the ratio of surface coverages of the selected colorants, (e) according to that ratio, dimensioning the colorant cells associated to these colorants; and (f) scaling said colorant cells by a horizontal and vertical reduction factor corresponding to the square root of the sum of the colorant surface coverages.

The juxtaposed dispersed dot halftoning procedure is preferably an error-diffusion procedure whose thresholds are randomly distributed, thereby ensuring that even for similar ink surface coverages each instance of the produced dispersed dot halftone has a completely different layout. Therefore, their embodiments, i.e. the instances of the produced juxtaposed clusters of densely spaced pixel segments have each time a different layout. Different layouts enable creating new colorants by overlays of several ink-specific juxtaposed clusters of densely spaced pixel segments without creating undesired moiré effects. Different layouts also tolerate small registration inaccuracies between the ink halftone layers without creating noticeable deviations in the reproduced color.

The error diffusion procedure is applied several times on juxtaposed clustered dot halftones in order to create the corresponding juxtaposed dispersed dot halftones embodied by clusters of densely spaced pixel segments, one for each ink layer. These ink-specific clusters of pixel segments are preferably packed onto a multibit dispersed dot screen element (FIG. 9B) that is then stored in the screen element library.

The created juxtaposed dispersed dot halftones can be part of a fluorescent color reproduction workflow for creating, within an output halftone space, fluorescent ink halftone separations for rotogravure printing, for offset printing, for inkjet or for electrophotography. Such a workflow comprises the steps of (a) selecting an input color image to be rendered as fluorescent color image visible only under UV light, (b) scanning the target output halftone space pixel by pixel and scanline by scanline, (c) determining the corresponding location within the selected input image, (d) obtaining the image color at that location, (e) accessing a previously established table that maps input image colors to surface coverages of the fluorescent colorants, (f) obtaining from said table the set of contributing colorants as well as their surface coverages, (g) obtaining according to said colorant surface coverages by accessing a screen element library a juxtaposed dispersed dot halftone, reading from the juxtaposed dispersed dot halftone the ink identifiers contributing to the current output pixel and copying them within the target output halftone space onto the corresponding ink halftone separations. For rotogravure printing, an ink halftone separation contains the pixel segments that specify the locations and areas of the corresponding rotogravure cylinder to be engraved. For flexography, the pixel segments specify the locations and areas of the raised elements, for offset printing, they specify the locations and areas of the ink attracting areas on the offset plate and for electrophotography, they specify the locations and areas of the photoconductor where toner will be attracted. The screen element library is a library of juxtaposed clustered or dispersed dot halftones. In the case of a screen element library of juxtaposed clustered dot halftones, dispersed dot halftoning is applied to them in order to obtain the juxtaposed dispersed dot halftones, preferably embodied by ink-specific clusters of densely spaced pixel segments.

For counterfeit protection, fluorescent color reproduction is carried out in order to synthesize colorful images visible only under UV light. These colorful images which are invisible under daylight are difficult to counterfeit without the software operable for performing the steps necessary to synthesize fluorescent juxtaposed dispersed dot halftones.

A rotogravure cylinder engraved according to the present invention incorporates densely spaced horizontal, vertical and possibly diagonal segments forming clusters which are surrounded by areas without segments. These sets of densely spaced clustered segments are laid out along diagonals having all the same orientation. In a smooth area of an image, successions of densely spaced clustered segments located along a section of a same diagonal have similarly sized areas. Clusters of pixel segments located on neighboring diagonals often differ in area sizes.

Juxtaposed dispersed dot halftoning can be advantageously used for offset printing of fluorescent images visible under UV light, by imaging the clusters of densely spaced pixel segments obtained by juxtaposed dispersed halftoning onto an offset plate. The locations and areas of these pixel segments define the ink accepting positions and areas of the offset plate. These ink accepting positions correspond to areas of the prints where ink is to be deposited. In the case of electrophotography, these pixel segments are laser imaged onto positions of the photoconductor, where toner particles (solid or liquid) will be attracted and transferred to paper. For inkjet, these pixel segments are directly imaged by inkjet printing onto the paper.

In a preferred embodiment, the steps for creating ink halftone separations incorporating juxtaposed dispersed dots are carried out by a computer running software. This software comprises a module for creating the juxtaposed dispersed dot halftones by performing dispersed dot halftoning on juxtaposed clustered dot halftones. For creating juxtaposed clustered dots, the software also comprises modules for (a) selecting among available colorants the ones to be placed within a specific screen element, (b) creating the layout of the screen element, (c) calculating the ratio of surface coverages of the selected colorants, (d) according to that ratio, dimensioning the colorant cells associated to these colorants, (e) obtaining said juxtaposed clustered dot halftones by scaling the colorant cells according to a an area reduction factor corresponding to the sum of the contributing colorant surface coverages.

The computing system for creating juxtaposed dispersed dot halftones can be part of a fluorescent color reproduction framework for creating within an output halftone space fluorescent ink separations for rotogravure printing, for offset printing, for inkjet printing or for electrophotography. Such a framework comprises software modules for (a)

reading into memory an input color image to be rendered as fluorescent color image visible only under UV light, (b) scanning the target output halftone space pixel by pixel and scanline by scanline, (c) determining the corresponding location within the selected input image, (e) obtaining the image color at that location, (f) accessing a previously established table that maps input image colors to surface coverages of colorants (g) obtaining from said table the set of contributing colorants as well as their surface coverages, (h) obtaining according to said colorant surface coverages by accessing a screen element library one of the juxtaposed dispersed dot halftones, reading from the obtained juxtaposed dispersed dot halftone the ink identifiers contributing to the current pixel and copying these ink identifiers within the target output halftone space into the corresponding ink halftone separations.

The computing system for creating juxtaposed dispersed dot halftones can be adapted to flexography printing. The locations and areas of the raised elements present on the flexography printing plate are specified by the pixel segments that are the constituents of the juxtaposed dispersed dot halftones. For offset printing, the pixel segments are imaged onto the offset plate, thereby forming ink accepting areas. For electrophotography, the pixel segments are laser imaged onto locations of the photoconductor where toner particles will be attracted.

Thanks to juxtaposed dispersed dot halftoning, we create by rotogravure, by pad printing, by flexography, by offset, by inkjet or by electrophotography printed color images, which are invisible under daylight and have, under UV light, a high resemblance with the original images. Applications comprises the protection of valuable items, e.g., security documents such as bank notes, passports, fiscal stamps, ID cards, entry tickets, travel documents, checks, credit cards, vouchers or valuable business documents. Applications also comprises the protection and/or decoration of valuable items such as software packages, medical drugs, watches, personal care articles, and fashion articles. Further applications comprise commercial digital art, decoration, publicity, fashion, and night life, where fluorescent images viewed under UV illumination at night or in the dark have a strongly appealing effect.

The authentication of valuable items such as security documents and valuable articles can rely on the characterization of the ink halftone separations produced by juxtaposed dispersed dot halftoning. These ink separations comprise juxtaposed sets of densely spaced clustered pixel segments. These pixel segments, mainly horizontal and vertical segments, are partly or fully surrounded by inactive pixels. By construction, juxtaposed sets of clustered pixel segments belonging to different colorants do not overlap. The clusters formed by densely spaced pixel segments are surrounded by non-active space. These clusters of pixel segments are laid out obliquely along diagonals having all the same orientation. In regions whose colors do not much vary, successive clusters of pixel segments located along a section of a same diagonal are associated to the same colorant and have similarly sized areas. Clusters of pixel segments located on neighboring diagonals are associated to different colorants.

The method for authenticating a valuable item compares the precomputed ink halftone separations with the fluorescent halftones emitted by the valuable item. In case the emitted fluorescent halftones comprise ink halftones that are similar to the halftones present in the ink halftone separations, the corresponding valuable item is considered to be authentic. If this is not the case, the corresponding valuable item is considered to be a counterfeit. For this purposed, one may compare channel by channel, the emitted fluorescent ink halftones captured by an RGB camera with the corresponding ink halftone separations.

It is also possible to compare the fluorescent colorant halftones formed by the superposition of the juxtaposed dispersed dot ink halftone separations with the fluorescent halftones emitted by a print located on the valuable item. To achieve this goal, one may simulate on a display the image formed by the colorant halftones and compare it with the fluorescent image acquired by an RGB camera which captures the fluorescent halftones emitted under UV by the fluorescent print. Such a comparison may also be carried out automatically, by a software module. In order to authenticate a printed item, a smartphone may be programmed to acquire the fluorescent halftones emitted by that printed item and to carry out such a comparison.

BRIEF DESCRIPTION OF THE DRAWINGS

FIG. 5A shows an example where colorant cell $c_1$ expands into the initial cells of colorants $c_2$ and $c_3$ and the corresponding equations;

FIG. 5B shows an example where colorants cells $c_1$ and $c_2$ expand into the cells of colorant $c_3$ as well as the corresponding equations;

DESCRIPTION OF THE INVENTION

Figure 1:
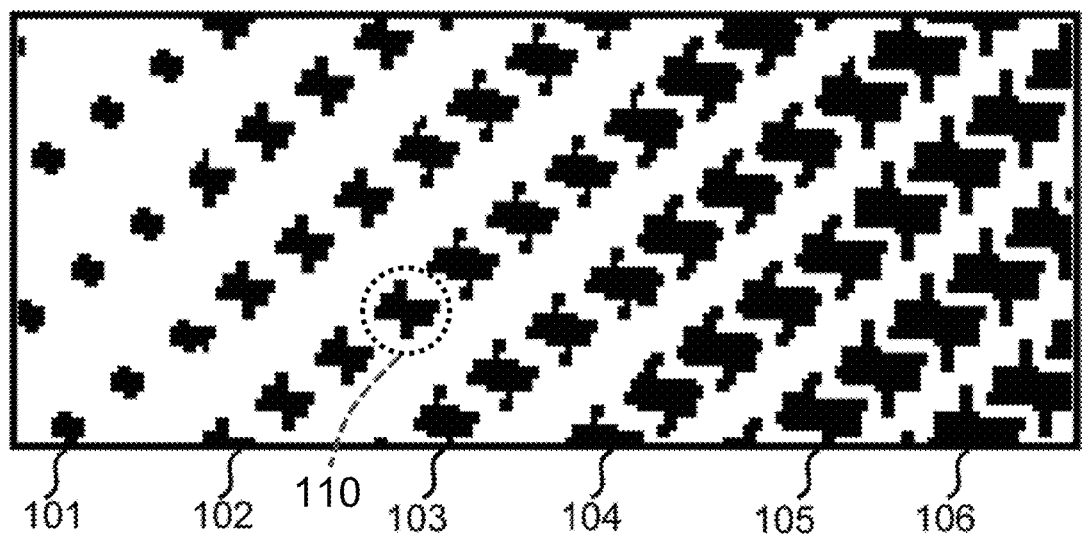
FIG. 1 shows an intensity ramp with from left to right increasing surface coverages 101, 102 . . . 106 of a colorant obtained by juxtaposed clustered dot halftoning.

The present invention describes a method for creating juxtaposed dispersed dot halftones useful for creating invisible fluorescent color halftone prints viewable under UV illumination, printable on printers such as gravure printers, rotogravure printers, pad printers, offset presses, inkjet printers, electrophotography printers or flexography printers. We give details of how the juxtaposed dispersed dot halftones can be generated. The overall color fluorescent reproduction framework comprises the following steps: (1) the creation of new colorants from a given set of fluorescent inks, (2) predicting with a fluorescent color prediction model the colors achievable with the selected set of colorants, (3) deriving the corresponding fluorescent colorant color gamut, (4) gamut mapping original image colors to the fluorescent colorant target gamut, (5) converting the gamut mapped original colors to surface coverages of the fluorescent colorants, (6) with the obtained surface coverages of the colorants creating juxtaposed clustered colorant dots and (7) applying juxtaposed dispersed-dot halftoning to the ink level reduced clustered colorant dots in order to generate the juxtaposed dispersed dot ink halftone separations.

The inventive steps rely on a specific halftoning technique disclosed for producing fluorescent ink halftone separation layers appropriate for gravure printing, pad printing, offset printing, inkjet, electrophotography or flexographic printing. This halftoning technique relies on juxtaposed dispersed dot halftoning, embodied by random threshold error diffusion. Instead of creating prior art juxtaposed clustered dot halftones such as the ones described in U.S. Pat. No. 8,085,438 to Hersch et al, the disclosed method creates first juxtaposed clustered dot halftones, reduces their ink level specifically for each ink layer and, with dispersed dot halftoning, generates the desired juxtaposed dispersed dot ink halftones. In addition, the present method shows how to extend the juxtaposed halftoning method to juxtaposed screen elements incorporating four or more colorants.

In order to avoid quenching effects as well as other non-linear effects, printed dots of different colorants should not overlap. The juxtaposed halftoning method disclosed in U.S. Pat. No. 8,085,438 to Hersch et al. ensures that clustered dots of different fluorescent colorants do not overlap. But at high surface coverages, neighboring colorant dots may touch each other, thereby forming large surfaces without separating boundaries between them.

Rotogravure printing relies on cells that are engraved into a cylinder. The cell's areas determine how much ink is stored in them. For high quality prints, there should not be too much variation in the gravure cell size. However, the dots created by juxtaposed halftoning according to U.S. Pat. No. 8,085,438 have very different sizes and can therefore not be directly used to create the gravure cells. As illustration, observe the juxtaposed clustered dots of FIG. 1 having both small 101 and large 105 sizes. In addition, according to U.S. Pat. No. 8,085,438, in case one colorant takes the space of the whole screen element, the juxtaposed dots touch each other and form a solid color area. Such a solid area is not compatible with rotogravure, since it does not leave space for the gravure cell boundaries. Therefore, there is a need to introduce inside the juxtaposed dots a second level of halftones called dispersed dot halftones, preferably implemented by a variant of error-diffusion. FIG. 2 shows an example of the resulting juxtaposed dispersed dot halftones. The black elements in the halftones of FIG. 2 describe the rotogravure cylinder engravings within which the ink is deposited. Most of these engravings form densely spaced small horizontal or vertical segments. The surface of these horizontal and vertical structures is much smaller than the surfaces of the corresponding juxtaposed clustered dots of FIG. 1. In addition, these dispersed segments are to a large extent surrounded by boundaries (white pixels in FIG. 2). These dispersed segments, from which the gravure cells are derived, are therefore appropriate for gravure printing processes.

Vocabulary

Figure 2:
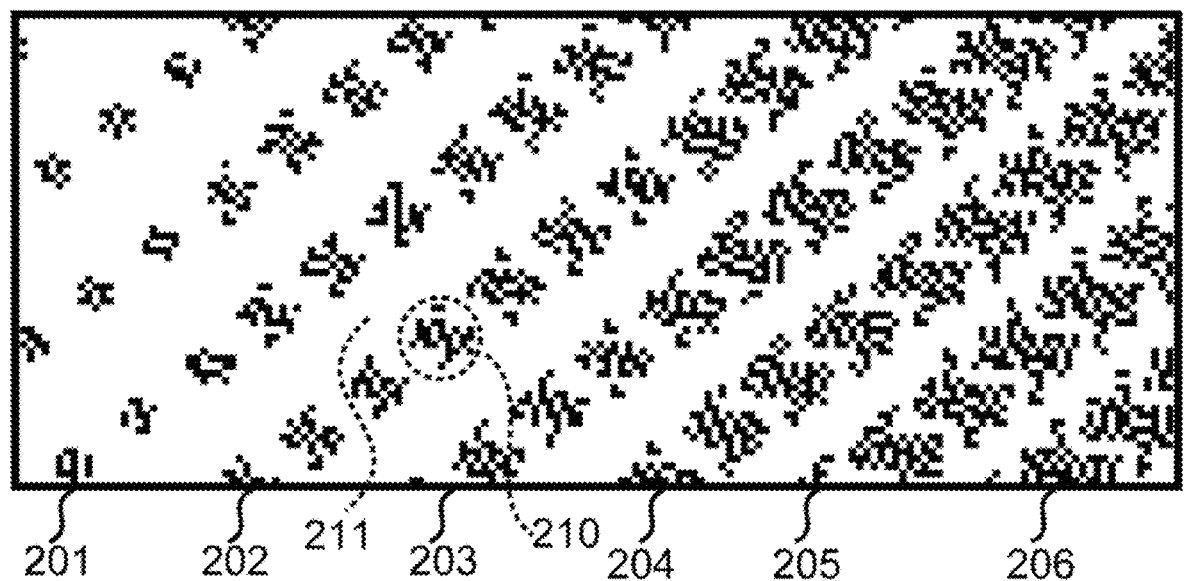
FIG. 2 shows for a single ink halftone the same intensity ramp 201, 202 . . . 206 as in FIG. 1 obtained by juxtaposed dispersed dot halftoning as well as clusters 210 of dispersed dots formed by small pixel segments, said clusters being surrounded with non-active space 211.
Figure 28:
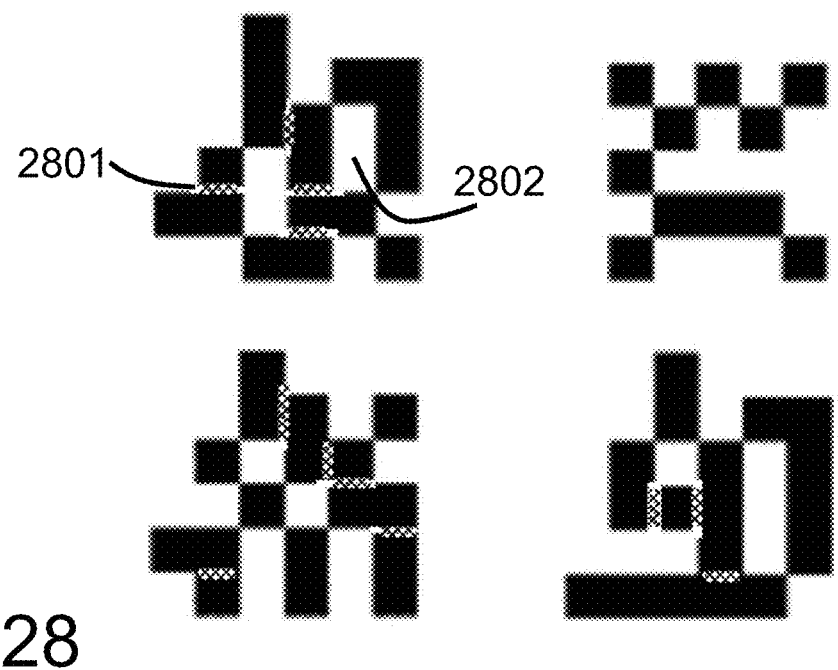
FIG. 28 shows a juxtaposed dispersed dot ink halftone separation, where the black active pixel areas indicate the areas that are to be engraved onto the rotogravure cylinder, with the hatched segments 2801 indicating connections between neighboring pixel segments and with the white non-active neighbor pixels 2802 indicating the presence of pixel segment boundaries.

Juxtaposed clustered dots are the solid area dots placed side by side, as shown in FIG. 1. Juxtaposed dispersed dots are obtained by applying dispersed dot halftoning to the juxtaposed clustered dots, as shown in FIG. 2. The resulting clusters of dispersed dots (example: 210) are surrounded by non-active unprinted 211 space and are embodied by clusters of densely spaced horizontal and vertical segments possibly touching each other along part of their sides (FIG. 28, with touching locations 2801 hatched). The horizontal and vertical segments are made of active pixels (shown as black pixels). The clusters (e.g. 210) of densely spaced horizontal and vertical segments are located within the areas 110 of the corresponding juxtaposed clustered dots (compare FIG. 1, 110 and FIG. 2, 210).

A fluorescent colorant is a fluorescent ink halftone or an overlay of fluorescent ink halftones that emits under UV illumination a given emission spectrum. Emission spectra are measured by illuminating the fluorescent sample with a UV light source and by capturing the emitted spectrum in the visible wavelength range with a spectrophotometer. The procedure is detailed in U.S. Pat. No. 8,085,438, under Section "Measurement equipment, paper and printer".

Figure 3A:
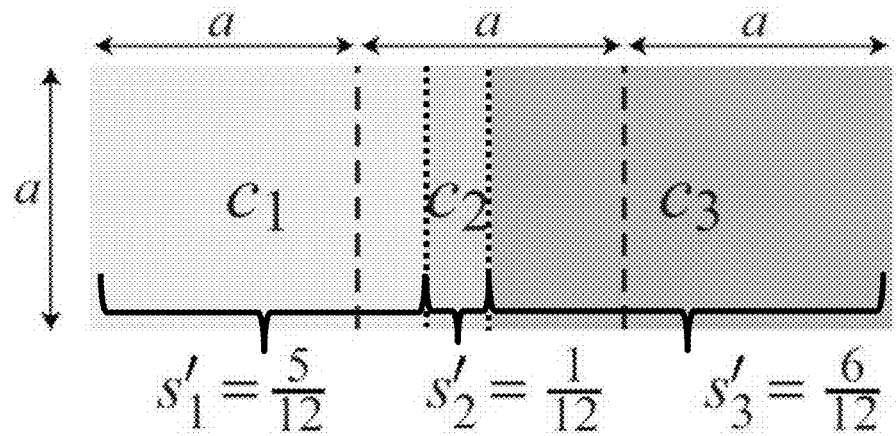
FIG. 3A shows a screen element formed by three colorant screen cells $c_1$, $c_2$, $c_3$, where colorant $c_1$ takes the ratio $s_1'=5/12$ of the screen element surface.
Figure 3B:
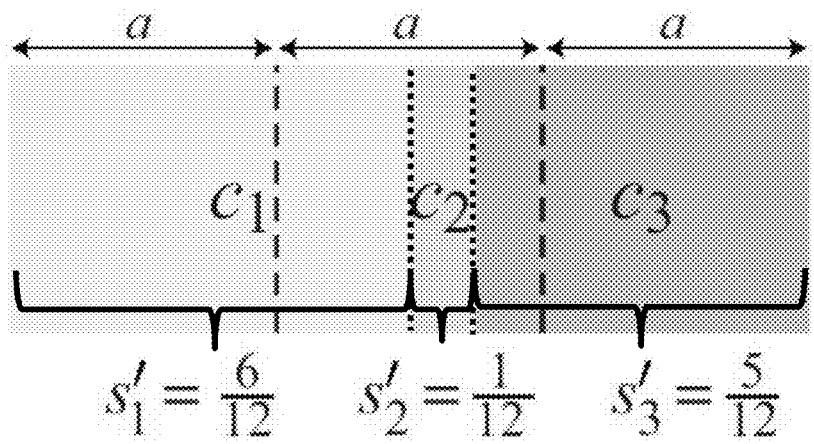
FIG. 3B shows a screen element formed by three colorant screen cells $c_1$, $c_2$, $c_3$, where colorant $c_1$ takes the ratio $s_1'=6/12$ of the screen element surface.

A screen element defines the halftone space allocated to several colorants that together will form the desired printed color. The screen elements shown in FIGS. 3A, 3B and 4 (410) can simultaneously incorporate up to 3 printable colorants. The screen elements shown in FIGS. 24A, 24B, 24C and 25 can simultaneously incorporate 4 printable colorants. One screen element cell is associated to each printable colorant. Initially, screen element cells have all the same surface of 1 divided by the number of printable colorants that are simultaneously present within the screen element. Then, according to the surface coverages of the printable colorants, the screen element cells become larger or smaller.

When dealing with surface coverages of the juxtaposed clustered or dispersed dots, we assume that they are normalized, i.e. the space allocated to one screen element is one. Such a screen element may incorporate three, four or more cells enabling having a single halftone made of three, four or more colorants.

Figure 9A:
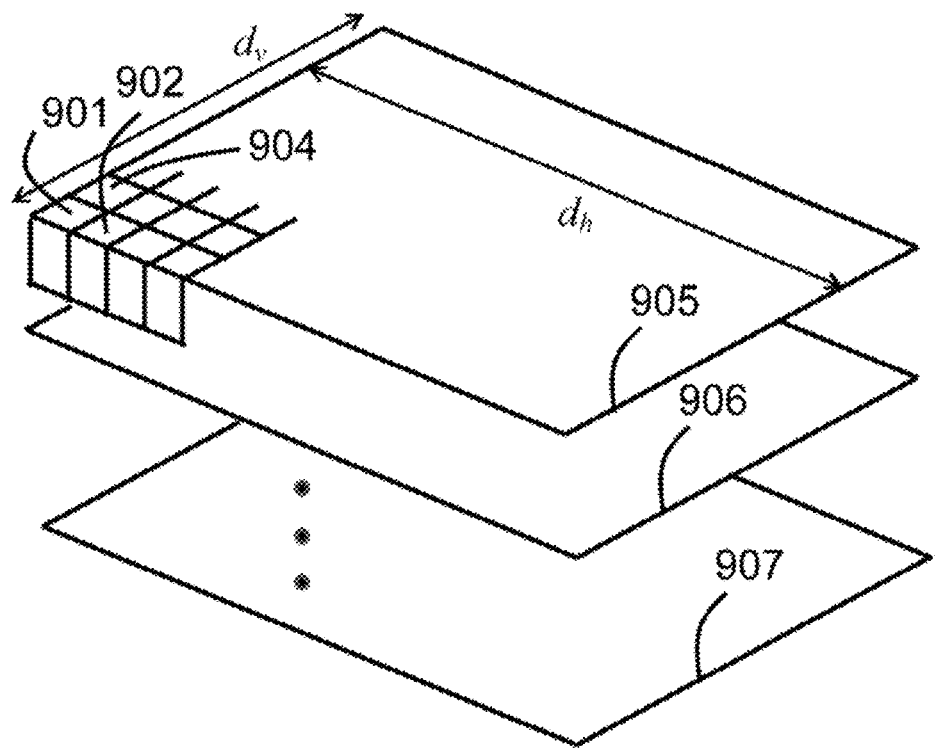
FIG. 9A shows equivalent horizontal rectangular screen tiles 905, 906 and 907 at different surface coverages of the colorants.
Figure 9B:
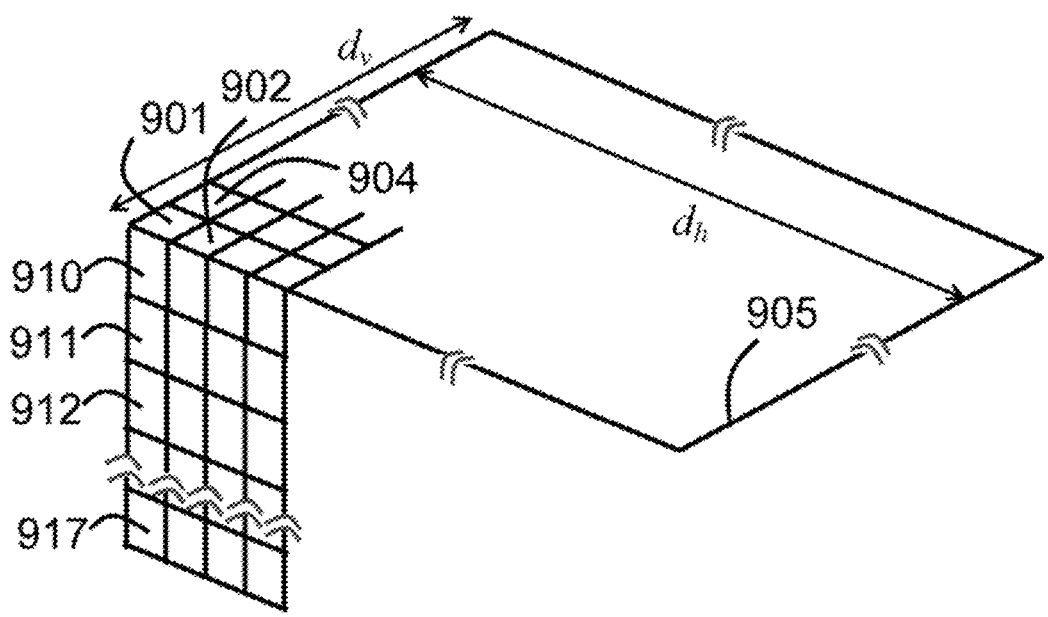
FIG. 9B shows the same screen tile 905 as in FIG. 9A, with pixels 901, 902, . . . , 904, each containing ink identifier bits 910, 911, 912, . . . , 917, where an individual ink identifier bit is associated to a given ink.

When creating the output ink halftone separations, pixel by pixel and scanline by scanline of the output halftone space are scanned. Concurrently, the screen element library is accessed and according to the surface coverages of the contributing colorants, a juxtaposed screen element (or screen tile) is accessed (FIG. 9B, 905). A juxtaposed dispersed dot screen element contains one bit per ink, e.g. bits 910, 911 and 912 in case of 3 fluorescent inks, e.g. blue, yellow-green and red. Such a bit, acting as an ink identifier, indicates the presence of the corresponding ink by being "active" or by being "printed". In the opposite case, it indicates the absence of the ink by being "non-active" or "unprinted". At the current pixel of the screen element, these ink identifier bits are read out and copied at the current position within the output halftone space onto the ink halftone separation layers.

The terms "ink halftone separation" or "ink halftone separation layer" designates a space in computer memory that contains information about the presence or absence of ink at each of its pixel positions. Active pixels indicate areas where, for rotogravure printing, cells are going to be engraved within the rotogravure cylinder. For flexographic printing, active pixels indicate areas of the print plate with the raised elements. For offset printing, active pixels indicate within the offset plate the locations of ink accepting areas. Within an ink halftone separation layer, a pixel with a value of "1" designates the presence of the ink and an ink with a value of "0" the absence of the ink. Equivalently, the pixel with a "1" is an "active" or "printed" pixel and the pixel with a "0" is an "non-active", "inactive" or "unprinted" pixel. In respect to offset printing, "active" pixels or pixel segments located in ink halftone separation memory are imaged onto the corresponding locations of the offset plate. After having inserted the offset plate into the offset press, its ink accepting locations attract the ink and transfer it onto the blanket. The blanket then transfers the ink onto the paper sheet. At the end of the printing process, the inked paper locations and areas correspond to the locations and areas of the active pixels or pixel segments located within the ink halftone separations that are present within the computer memory.

A screen tile (e.g. FIG. 4, 401) comprises one or several screen elements. Often, a screen tile has the shape of an obliquely oriented rectangle or parallelogram (e.g. FIG. 6) and replicates itself by using its sides as replication vectors. A horizontal rectangular equivalent screen tile (FIG. 7 or FIG. 8, $T_0$) can be build, which contains the same information as in the original diagonally oriented rectangular or parallelogram screen tile. This equivalent horizontal rectangular screen tile replicates itself according to a horizontal vector (FIG. 7, $w_a$) and to an oblique vector (FIG. 7, $w_b$), see Section "Equivalent horizontal rectangular screen tiles".

A screen element library is a library containing instances of a screen element or of a screen tile, with different entries corresponding to different surface coverages of the colorants present within the screen element or screen tile. The screen element library is accessed to read out a given pixel or a set of pixels located within a juxtaposed clustered or dispersed dot halftone. In case of a juxtaposed dispersed dot halftone, the pixel that is read contains the ink values, i.e., the presence or the absence of the contributing inks. The pixel read out acts as an ink identifier.

A bitmap is a 2D array of pixels, with in general one byte per pixel, i.e. 8 bits per pixel. Binary bitmaps have 1 bit per pixel. Bitmaps can also be composed of 4 bits per pixel (nibbles).

Figure 10:
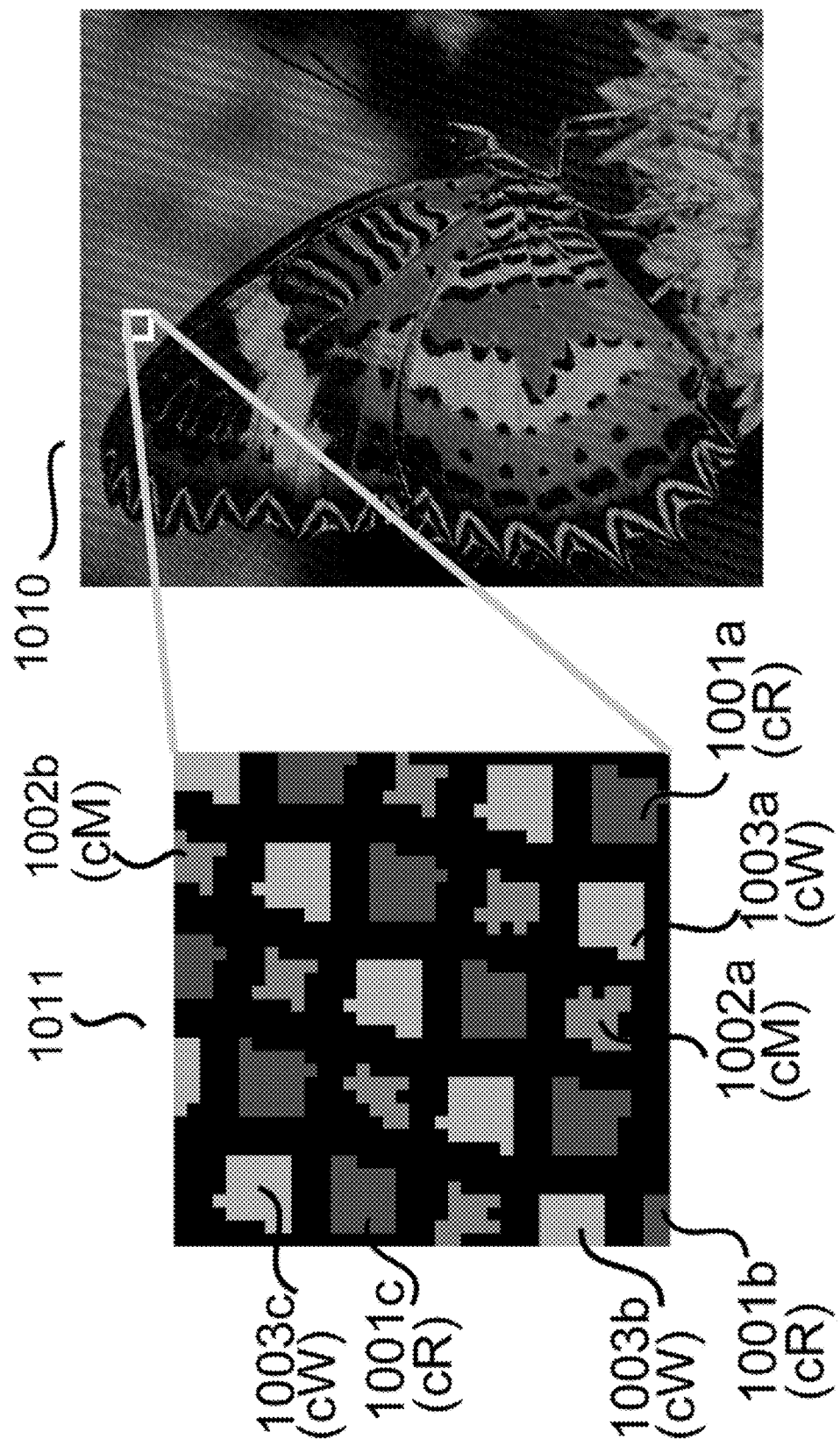
FIG. 10 shows on the right 1010 a software preview of a printed rotogravure picture with juxtaposed diagonally laid out colorant halftones, and on the left 1011 an enlargement showing a simulation of the printed juxtaposed dispersed dot fluorescent colorant halftones, where, due to ink spreading, the individual dispersed segments are not visible.

We use the terms "printed pixels" or "active pixels" for specifying active pixels in memory, pixels that could be printed, or depending on the context, pixels that are actually printed on a substrate. In the figures showing clustered or dispersed dot halftones, the active pixels are shown as black pixels and have the default binary value of "1". The non-active pixels or inactive pixels are shown as white pixels and have the default binary value of "0". For rotogravure printing, active pixels define the shape of the rotogravure cells and are therefore also called "printed pixels". Non-active pixels define the space between the rotogravure cells and are therefore also called "unprinted pixels". Connected non-active (or equivalently: unprinted) pixels form an "unprinted space" or equivalently a "non-active space". Under UV illumination, unprinted pixels are not white but black (FIG. 10, 1011). This is due to the fact that under UV light unprinted paper without fluorescent brighteners does not have a fluorescent emission.

The same juxtaposed dispersed dot halftoning framework used for generating rotogravure, offset, inkjet or flexography prints can also be used for electrophotography. When, in the context of electrophotography, the term "ink" appears, it also means "toner".

Generation of Juxtaposed Clustered Dot Halftones

Figure 4:
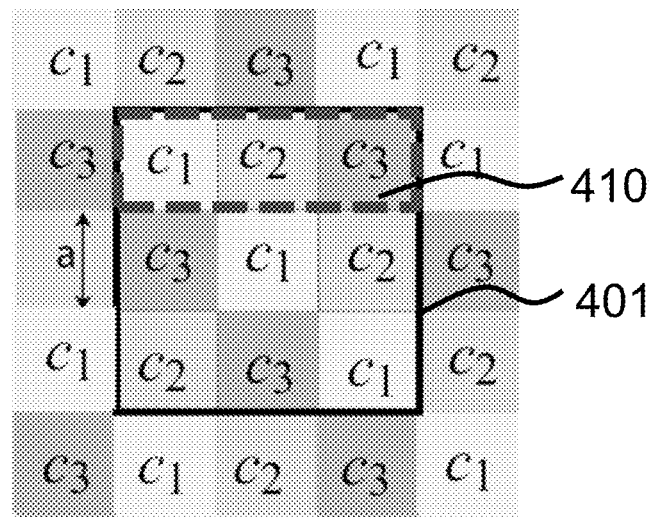
FIG. 4 shows a screen tile formed by a 3 by 3 arrangement of the screen cells $c_1$, $c_2$, $c_3$.

Since the generation of juxtaposed dispersed dot halftones requires as a first step the generation of juxtaposed clustered dots, let us recall the juxtaposed clustered dot halftoning method used for the generation of juxtaposed clustered dots incorporating simultaneously up to three colorants (FIG. 4). The method can be extended to more colorants, see Section "Extension of juxtaposed dispersed dot halftoning to 4 or more colorant halftones". The exact position and area of a screen element cell associated to one colorant depends on the surface coverages of the other colorants. For example, with a surface coverage ratio $s_2'=1/12$, colorant cell $c_2$ is positioned differently if the relative surface coverage of the neighboring colorant $c_1$ is small and the one of $c_3$ is large or vice-versa (compare FIGS. 3A and 3B).

The fact that the screen element cell position and growing behavior depends on the neighboring colorant surface coverages excludes dither matrix based clustered dot halftoning techniques. We therefore create a library of juxtaposed screen element halftones incorporating many possible halftone combinations of 3 fluorescent colorants $c_1$, $c_2$, $c_3$ and unprinted black $c_4$. We start by defining for the initial cells equal areas, each one of size of 1/3. Starting with square cells of side a, one may easily create a juxtaposed screen tile with a 3×3 juxtaposed screen cell array (FIG. 4, 401), containing in one row the cells $c_1$, $c_2$ and $c_3$, and in each successive row the same cells, but shifted by one position. Such a 3×3 juxtaposed dot cell array has the advantage that a cell of a given colorant (e.g. $c_1$) has as its two direct horizontal neighbors and as its two direct vertical neighbors the two other colorants (e.g. $c_2$ and $c_3$).

Let us create the juxtaposed clustered screen element cells $c_1$, $c_2$, $c_3$ whose areas and positions within a screen element are a function of the surface coverages $s_1$, $s_2$, $s_3$ of the corresponding colorants. Initially, the total surface of the three adjacent cells $c_1$, $c_2$ and $c_3$ forms a normalized surface of unit size. Therefore, initially, a single cell has a surface of 1/3 and a corresponding cell side $a_n=\sqrt{1/3}$ in case of a square initial cell. The surface coverage $s_{black}$ of the unprinted black surface part is the unit surface coverage of the screen element (FIG. 4, 410) minus the sum of the surface coverages of the 3 colorants present in that screen element $$s_{black}=1-(s_1+s_2+s_3) \tag{1}$$

In order to distribute the unprinted black between juxtaposed colorant screen dots, we first compute from the desired distribution of colorant surface coverages $s_1$, $s_2$, and $s_3$ the derived ratios of colorant surface coverages $s_1'$, $s_2'$, and $s_3'$ covering the full juxtaposed screen element surface without leaving unprinted areas.

The ratios of colorant surfaces are $$s_1' = \frac{s_1}{s_1+s_2+s_3}, s_2' = \frac{s_2}{s_1+s_2+s_3}, s_3' = \frac{s_3}{s_1+s_2+s_3} \tag{2}$$

In order to generate juxtaposed clustered colorant screen dots, we spread out the part of each colorant with surface coverage larger than its initial cell surface (e.g. larger than 1/3) both horizontally and vertically into its neighboring dot cells in proportion to the surface coverage ratio of their unprinted cell space (FIG. 5A).

FIG. 5A shows the case $s_1'>1/3$, $s_2'<1/3$, and $s_3'<1/3$, i.e. where the colorant surface $(s_1'-1/3)$ is spread out over neighboring cells $c_2$ and $c_3$. Applying simple geometric considerations, we compute the thickness h of the horizontal and vertical bands allowing to distribute the surface $s_1'-1/3$ from cell $c_1$ into horizontal and vertical neighboring cells $c_2$ and $c_3$, according to the ratio of $1/3-s_2'$ and $1/3-s_3'$. The equation system (A1) to (A7) shown in FIG. 5A comprises the surfaces $s_{12}'$ and $s_{13}'$ representing respectively the part of surface ratio $s_1'$ spilling out into cells $c_2$ and the part of it spilling out into cells $c_3$. In order to obtain the band thicknesses $h_{12}$ and $h_{13}$, we solve this system of equations. We obtain $$h_{12} = \frac{1-\sqrt{1-s_1+2s_2-s_3}}{\sqrt{3}} \text{ and } h_{13} = \frac{1-\sqrt{1-s_1-s_2+2s_3}}{\sqrt{3}} \tag{3}$$

FIG. 5B shows the second case $s_1'>1/3$, $s_2'>1/3$, and $s_3'<1/3$, where respective surfaces of both $c_1$ and $c_2$ spill out into cells $c_3$. By solving the set of equations (B1) to (B7) for the band thicknesses $h_{13}$ and $h_{23}$, we obtain $$h_{13} = \frac{2s_1-s_2-s_3}{\sqrt{3}\cdot(1+\sqrt{1-s_1-s_2+2s_3})} \text{ and} \tag{4}$$

$$h_{23} = \frac{s_1-2s_2+s_3}{\sqrt{3}\cdot(1+\sqrt{1-s_1-s_2+2s_3})}$$

This juxtaposed screen dot cell growing strategy yields well clustered juxtaposed screen dots.

In summary, clustered colorant surface layouts are computed according to ratios of their surface coverages by calculating how much individual colorants spread out into neighboring colorant cells. The layout of a colorant i larger than its initial cell size is formed by its colorant initial cell $c_1$ and by the bands $h_{ij}$ representing how much such a colorant spreads out into its neighboring colorant initial cells j.

After partitioning the screen element space according to the respective surface ratios $s_1'$, $s_2'$, $s_3'$, the unprinted black is restored between the juxtaposed colorant cells by scaling down each newly sized colorant cell (FIG. 5A, $c_1$, $c_2$, $c_3$) so as to recover its desired original surface coverage. This scaling down operation is performed by fixing the location of the center of the cell and by multiplicatively scaling down the horizontal and vertical cell dimensions by the square root of the sum of the original surface coverages, i.e. by $\sqrt{s_1+s_2+s_3}$. In terms of areas, the resulting colorant areas are scaled down by the sum of the original surface coverages. This scaling down operation ensures that the unprinted space is correctly placed around each colorant surface.

In order to create raster screen elements having a surface close to the surface of their respective polygons (polygons defining the surfaces of the cells $c_1$, $c_2$ and $c_3$, after the scaling down operation), we need oblique polygon borders. We therefore rotate the initial quadratic screen cells of side a forming the screen tile by a small angle (e.g. $\alpha$=a tan(1/a)). We also scale them slightly (e.g. by factor $s=\sqrt{a^2+1}/a$) in order to have their vertices located on the pixel grid. After having applied this transformation to all rectangles, squares or polygons of the screen tile, we rasterize them and obtain the juxtaposed screen element associated to the desired fluorescent colorant surface coverages $s_1$, $s_2$, $s_3$. The unprinted black surface coverage is $s_{black}=1-(s_1+s_2+s_3)$. The unprinted black surface is the surface between the screen cells, e.g. FIG. 24C, 2420. The resulting screen element may become part of the screen element library.

The juxtaposed screen element library with n+1 different intensity levels for a juxtaposed screen element surface size n is constructed by iterating for colorant $c_1$ over surface coverages $s_1$, from 0 to 1 in steps of 1/n, for colorant $c_2$, by iterating over surface coverages from 0 up to the value of $1-s_1$, and for colorant $s_3$ from 0 up to the value of $1-s_1-s_2$ (constraint: $s_1+s_2+s_3 \leq 1$). A program counting the number of all possible screen elements as a function of the number of intensity levels n+1 yields the number of screen elements that must be stored in the library.

Equivalent Horizontal Rectangular Screen Tiles

According to T. M. Holladay, Optimum algorithm for halftone generation for displays and hard copies, in Proceedings of SID, vol. 21, 1980, pp. 185-192, one may represent an oblique discrete tile such as an oblique discrete screen element as a horizontally laid out rectangular tile comprising the same number of pixels as the original oblique tile. This equivalent horizontal rectangular tile can be replicated by vectors $w_a$, $w_b$ or $w_c=w_b-w_a$ so as to pave the plane (FIG. 7). A juxtaposed screen tile having 3 by 3 colorant cells of initial cell dimensions given by cell side vector ($\alpha$,1), with orientation $\alpha$=a tan(1/a) incorporates n=9($\alpha^2$+1) pixels. The corresponding equivalent horizontal rectangular tile comprises also n=9($\alpha^2$+1) pixels. For example, a juxtaposed screen tile of 3 by 3 colorant cells, having each a surface of 65 pixels ($\alpha$=8) yields an oblique rectangular tile of size 9×65=585 pixels (FIG. 6).

Figure 6:
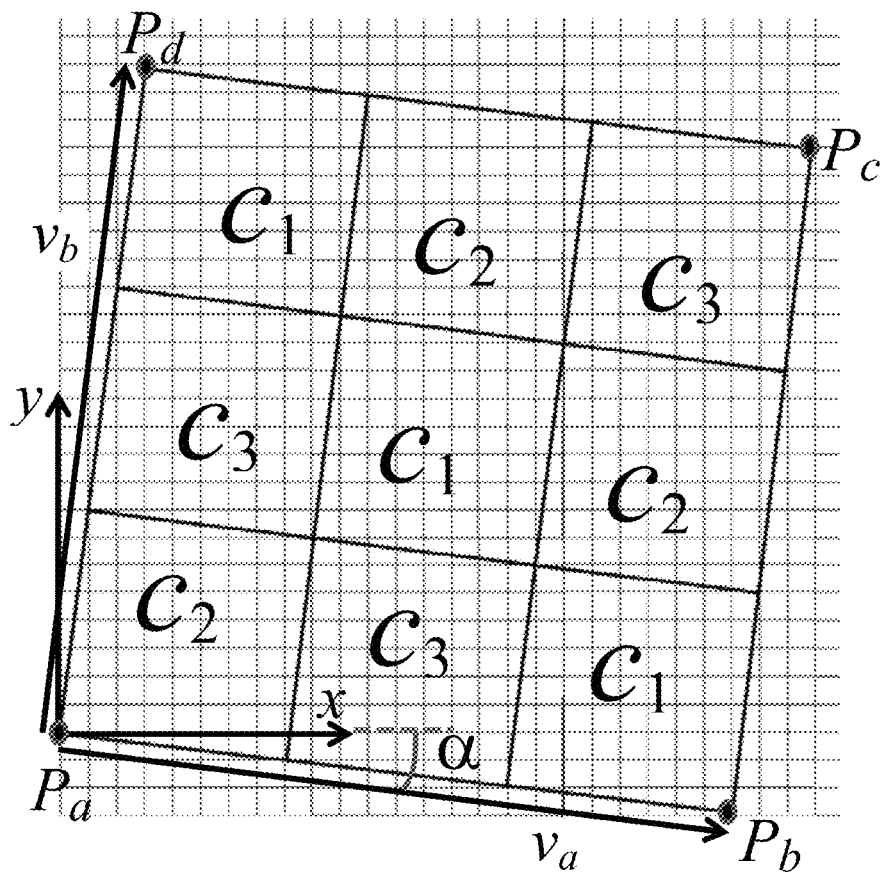
FIG. 6 shows a screen tile made of the same 3 by 3 arrangement of the initial screen element cells $c_1$, $c_2$, $c_3$ shown in FIG. 4, but slightly enlarged and rotated in order to obtain slightly oblique screen cell boundaries, with the screen tile being replicated with vectors $v_a$ and $v_b$.
Figure 7:
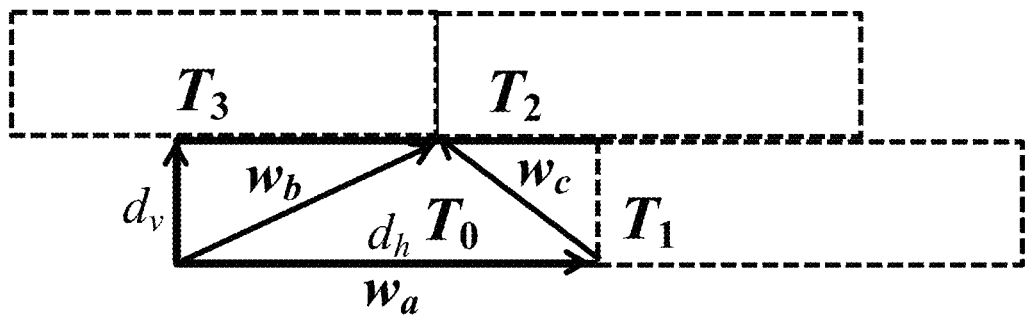
FIG. 7 shows the equivalent horizontal rectangular screen tile $T_0$ replicated into tiles $T_1$, $T_2$ and $T_3$ with vectors $w_a$, $w_b$, and $w_c=w_b-w_a$, with tile $T_0$ containing the same pixels as the oblique screen tile shown in FIG. 6.

Let us calculate the parameters of the horizontal equivalent rectangular bitmap tile, which when replicated by vectors $w_a=(w_{ax}, w_{ay})$ or $w_b=(w_{bx}, w_{by})$ or by their multiples creates the same bitmap as the bitmap that is created when replicating the slightly oblique tile containing the 9 cells (FIG. 6). In the example of FIG. 6, the original oblique tile with vertices $P_a=(0,0)$, $P_b=(24,-3)$, $P_c=(27,21)$, $P_d=(3,24)$ can be replicated with vectors $v_a$ and $v_b$ identical to its low and left sides, i.e. $v_a=(24,-3)$ and $v_b=(3,24)$, see FIG. 6.

Let us call f the number of times that vector $v_a$ is repeated and g the number of times that vector $v_b$ is repeated. Equation (5) states that $v_a$ is repeated f times and $v_b$ is repeated g times in order to reach the same vertical position. We solve that equation to obtain the smallest number of repetitions. Value $d_h$ gives the number of pixels horizontally after which the tile repeats itself. All values are integer values.

$$f \cdot v_a + g \cdot v_b = d_h \cdot \begin{bmatrix} 1 \\ 0 \end{bmatrix} \quad (5)$$

Solving the y-part of this diophantine vector equation for f and g yields the following solutions, where integer number m can be freely chosen:

$$f = \frac{v_{by}}{GCD(v_{ay}, v_{by})} \cdot m; \ g = -\frac{v_{ay}}{GCD(v_{ay}, v_{by})} \cdot m; \ m \in Z \quad (6)$$

where the term "GCD" is known from mathematics as "Greatest common denominator".

The smallest horizontal repetition period is obtained by setting m=1 and inserting Eqs. (6) into Eq. (5):

$$d_h = \frac{v_{by}}{GCD(v_{ay}, v_{by})} \cdot v_{ax} - \frac{v_{ay}}{GCD(v_{ay}, v_{by})} \cdot v_{bx} \quad (7)$$

In our example, with $v_a=(24,-3)$ and $v_b=(3,24)$, the greatest common denominator of −3 and 24 is 3. We obtain $d_h$=24/3·24−(−3/3·3)=192+3=195. Therefore, the original oblique tile repeats itself at the same vertical position after a horizontal shift of 195 pixels. The minimal equivalent rectangular tile has the same surface as the original oblique tile (FIG. 6) and has horizontal length $d_h$. The general expression for the size S of the oblique parallelogram or rectangular tile is $$S=|v_a \times v_b|=v_{ax} \cdot v_{by} - v_{bx} \cdot v_{ay} \quad (8)$$

where 'x' is the cross-product operation. According to Equations (7) and (8), the vertical size $d_v$ of the equivalent horizontal tile is $$d_v = S/d_h = (v_{ax} \cdot v_{by} - v_{bx} \cdot v_{ay})/d_h = GCD(v_{ay}, v_{by}) \quad (9)$$

Therefore, in our example, the vertical size of the equivalent rectangular tile is $d_v$=GCD(−3, 24)=3.

The equivalent horizontal rectangular tile repeats itself horizontally by being translated by horizontal vector $w \alpha=(d_h, 0)$. It also repeats itself obliquely by being translated with vector $w_b=(w_{bx}, w_b \ y)$. The vertical component of $w_b$ is equal to the rectangular tile vertical size:

$$w_{by}=d_v=GCD(v_{ay}, v_{by}) \quad (10)$$

Let us calculate the horizontal component $w_{bx}$ of replication vector $w_b$. The original oblique tile repeats itself k times in direction $v_a$ and l time in direction $v_b$. These repetitions are equivalent to the repetition of the horizontal rectangular equivalent tile by vector $w_b$.

The resulting vector equation is $$k \cdot v_a + l v_b = w_b \quad (11)$$

or expressed with the vector components $$k \cdot \begin{bmatrix} v_{ax} \\ v_{ay} \end{bmatrix} + l \cdot \begin{bmatrix} v_{bx} \\ v_{by} \end{bmatrix} = \begin{bmatrix} w_{bx} \\ w_{by} \end{bmatrix} \quad (12)$$

Considering the y components of Eq. (12) as well as Eq. (10), we obtain $$k = \frac{GCD(v_{ay}, v_{by}) - l \cdot v_{by}}{v_{ay}} \quad (13)$$

Now we can insert k into the x component of Eq. (12) and obtain:

$$w_{bx} = \frac{v_{ax}}{v_{ay}} \cdot GCD(v_{ay}, v_{by}) + l\left(\frac{v_{bx}v_{ay} - v_{ax}v_{by}}{v_{ay}}\right) \quad (14)$$

and by considering Eq. (8), one obtains $$w_{bx} = \frac{v_{ax} \cdot GCD(v_{ay}, v_{by}) - l \cdot S}{v_{ay}} \quad (15)$$

In our example, the size S in number of pixels of the equivalent horizontal rectangular tile is according to Eq. (8): S=24·24−3(−3)=24·24+3·3=585. According to Eq. (10), $w_{by}$=GCD (−3,24)=3 and according to Eq. (15), $w_{bx}$=(24·3−585)/(−3)=171. Therefore, the equivalent horizontal rectangular tile replication vectors (FIG. 7) are $w_a$=($w_{ax}$, $w_{ay}$)= ($d_h$,0)=(195,0) and $w_b$=($w_{bx}$, $w_{by}$)=(171, $d_v$)=(171, 3).

Figure 8:
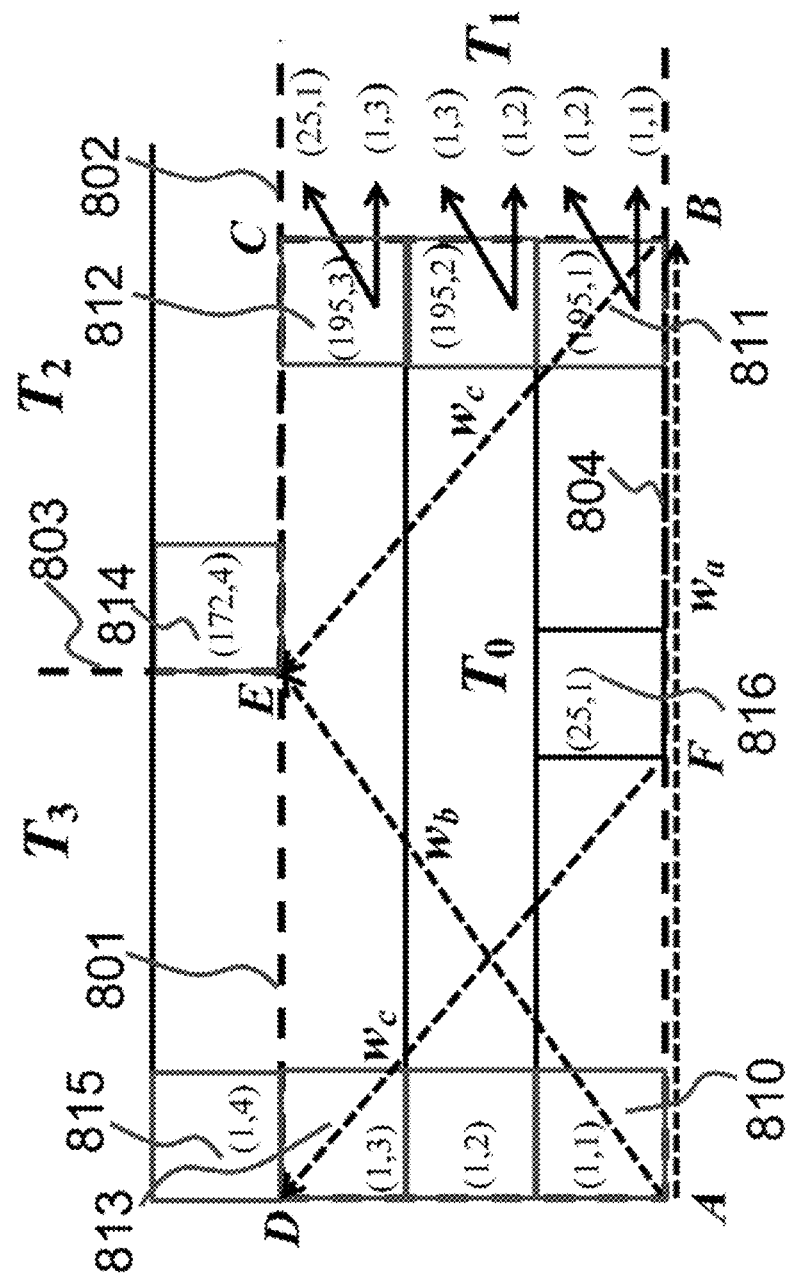
FIG. 8 shows the same screen tiles as in FIG. 7, but enlarged and with the (x,y) coordinates of the screen tile pixels at the start and end of the scanlines.

In the example of FIG. 8, vector $w_a$ replicates tile $T_0$ having vertices ABCD into its right adjacent tile $T_1$ whose left border is BC. Vector $w_b$ replicates tile $T_0$ having vertices ABCD into the tile $T_2$ having the lower left corner E, i.e. e.g. pixel 810 is replicated into pixel 814. Vector $w_c=w_b-w_a$ replicates tile $T_1$ into tile $T_3$, i.e. corner B is replicated into corner E. The replication operation replicates the tile structure into its neighborhoods. These replication vectors also enable deducing the position within a screen element tile associated to a given position within the output halftone space.

Generating the ink halftone separations by software requires the halftoning software module to simultaneously scan the halftone image space horizontally pixel by pixel and vertically scanline by scanline and also in synchronization scan the equivalent horizontal rectangular tile as explained below. When traversing the pixels of the halftone image space, the program starts for example at pixel (1,1) within the halftone image space and at the same time at pixel (1,1) of the equivalent horizontal rectangular tile (FIG. 8, 810). The program follows the pixels of the halftone image and of the equivalent horizontal rectangular tile horizontally until it reaches the last pixel 811 of the equivalent rectangular tile. The horizontal vector attached to last pixel 811 specifies the next pixel location within the equivalent horizontal rectangular screen tile, in the present case pixel 810. This corresponds to a displacement by vector (−$w_a$) from pixel (196,1). When the right end of the halftone image scanline is reached, the next pixel of both the halftone image scanline and the tile scanline is pixel (1,2) located at the beginning of the next scanline, specified by the oblique vector associated to the last tile position 811. The same scheme is applied to the next scanlines. When the last pixel 812 of the last scanline within the tile is reached, the next pixel is specified by its associate oblique vector which points to pixel 816, in the present example to pixel (25,1). This corresponds to a displacement by vector (−$w_a$−$w_c$) from the pixel in the forward upwards direction following pixel 812, i.e. pixel (196,4). Scanning the whole halftone image space corresponds to repeated scans of the equivalent rectangular tile, by performing the corresponding displacements when reaching the end of the tile or when reaching the end of the halftone image scanlines.

Juxtaposed Screen Element Library

The juxtaposed screen element library (FIG. 9A) is preferably constructed by creating a library of equivalent rectangular tiles, each one corresponding to certain surface coverages of the fluorescent colorants, to which corresponding ink halftones 905, 906, 907 are associated. In the case of three inks, for example the fluorescent red, yellow-green, and blue inks, the presence of three printable fluorescent inks are described by their identifiers, i.e. by the three bits embedded within a byte (FIGS. 9B, 910, 911 and 912) or within a nibble (half a byte). Each equivalent rectangular tile has the size $d_h$ by $d_v$ and is formed by pixels (FIG. 9B, e.g. 901, 902, 904) having each one the size of one byte (or of one nibble). Bit 0 (910) of each byte can be understood as the bit identifying the fluorescent blue ink tile, bit 1 (911) of each byte can be understood as the bit identifying the fluorescent yellow-green ink tile and bit 2 (912) of each byte can be understood as the bit identifying the fluorescent red ink tile. These bits 0, 1 and 2 are called "ink identifier bits" or "ink identifiers" and are associated to the current juxtaposed dispersed dot halftone pixel.

After creation of the juxtaposed clustered dot colorant halftones, the juxtaposed dispersed dot halftones are obtained by applying the dispersed dot halftoning procedure once for each contributing ink layer. This generates the juxtaposed dispersed colorant dot halftones with the ink identifier bits shown in FIGS. 9B, 910, 911 and 912. In this context, the preferred dispersed dot halftoning procedure is the random threshold error diffusion procedure, which generates each time a different layout of the dispersed halftone.

In case of a screen element library containing juxtaposed clustered dot halftones, each of these clustered dots represents a colorant. The dispersed dot halftoning procedure applied on the juxtaposed clustered dots generates the corresponding juxtaposed dispersed dot halftones, with one bit per ink layer. In a preferred embodiment, the dispersed dot halftoning procedure is embodied by random threshold error diffusion, which generates for each ink layer that contributes to the colorants of the current screen element, an ink-specific cluster of densely spaced pixel segments. These ink-specific clusters of densely space pixel segments (FIG. 12, 1201, 1202 and 1203) are assembled into a screen element or screen tile forming the juxtaposed dispersed dot halftone (FIG. 9B).

In case of a screen element library containing juxtaposed dispersed dot halftones, each pixel of such a halftone contains the ink identifier bits indicating the presence or absence of inks. FIG. 9A shows tiles 905, 906 and 907 representing different surface coverages of the fluorescent colorants. For colorants composed of several inks, several bits (910, 911 or 912) of the same pixel (e.g. 901) may be simultaneously activated. For colorants that are formed by a single fluorescent ink, only one or none of the ink identifier bits within the same pixel are activated. For the fluorescent magenta colorant composed by the overlay of the fluorescent blue and the fluorescent red ink, within the same tile pixel, ink identifier bits of the blue ink tile and of the red ink tile may be activated (bits 910 and 912). For the white colorant which is composed by the overlay of the fluorescent blue, fluorescent yellow-green, and fluorescent red inks, within the same tile pixel, ink identifier bits of the blue ink tile, of the yellow-green ink tile and of the blue ink tile may be activated (bits 910, 911 and 912).

FIG. 10 shows a software preview 1010 of an original color image printed by rotogravure and at the left side 1011 an enlargement of a region of the fluorescent color image 1010, with the corresponding simulated printed fluorescent colorant juxtaposed dispersed dots, where different gray tones represent different colorants. Due to its limited capabilities, this software preview only shows the clustered dots associated to different colorants. In real prints, dispersed dot halftones are present within the area of the clustered dots. Let us consider a halftone formed by the fluorescent red, magenta and white colorants. The red colorant (cR) appears in the diagonal rows 1001a, 1001b and 1001c. The magenta colorant (cM) appears in the diagonal rows 1002a and 1002b. The white colorant (cW) appears in diagonal rows 1003a, 1003b and 1003c. The magenta colorant juxtaposed dots (1002a and 1002b) are formed by the overlay of the fluorescent blue and red ink-specific clusters of dispersed dot halftones. The white colorant juxtaposed dots (1003a, 1003b, 1003c) are formed by the overlay of the fluorescent blue, fluorescent yellow and fluorescent red ink-specific clusters of dispersed dot halftones. The red colorant (1001a, 1001b and 1001c) is identical with the fluorescent red ink cluster of dispersed dot halftone.

Figure 11:
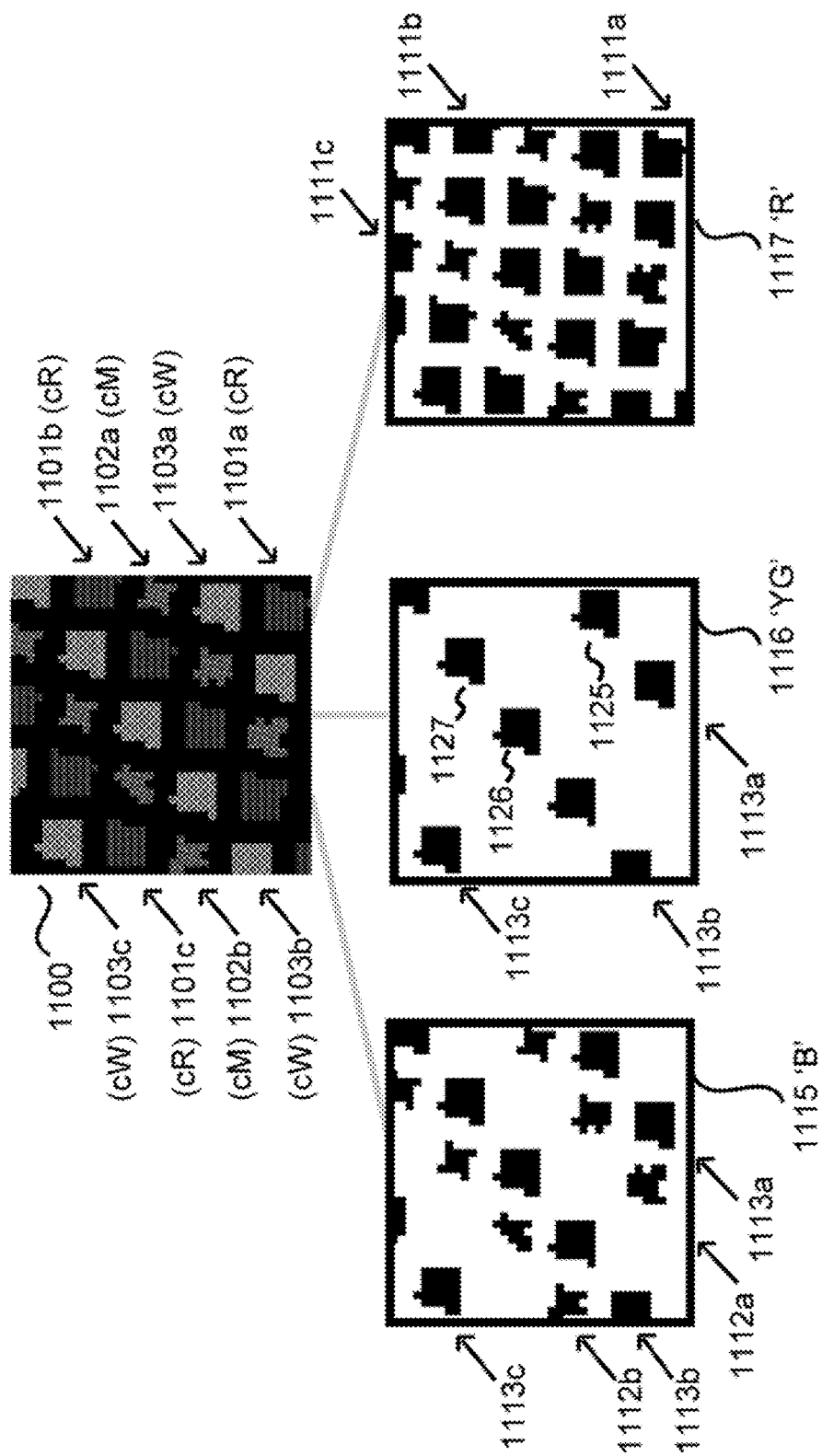
FIG. 11 shows schematically on the top 1100 the same enlargement as in the left part of FIG. 10 with the diagonally laid out red (cR), magenta (cM) and white (cW) simulated printed juxtaposed dispersed colorant dots and on the bottom the associated juxtaposed clustered dot ink separations blue (B), yellow-green (YG) and red (R)

FIG. 11 shows on the top 1100 the same simulated printed fluorescent colorant juxtaposed dispersed dots as in FIG. 10, 1011. The fluorescent red colorant dots (cR) are marked as diagonals 1101a, 1101b, 1101c. The magenta colorant dots (cM) are marked as diagonals 1102a and 1102b. The white colorant dots (cW) are marked as diagonals 1103a, 1103b, 1103c. The bottom part of FIG. 11 shows the corresponding juxtaposed clustered dots separation layers, before applying dispersed dot halftoning: the fluorescent blue ink clustered dot separation layer 1115, the fluorescent yellow-green clustered dot ink separation layer 1116 and the fluorescent red clustered dot ink separation layer 1117. The blue ink separation layer 1115 is present within the colorant halftone dots of magenta and white. It appears therefore for fluorescent colorant magenta in columns 1112a, 1112b, and for fluorescent colorant white in columns 113a, 113b and 113c of the blue ink separation layer 1115. The yellow-green separation layer 1116 is only present at the locations of the white colorant, i.e. the colorants dots 113a, 113b and 113c. The red separation layer 1117 is present for the red, the magenta and the white colorants, i.e. all the colorants that appear in the halftone 1011 of FIG. 10.

The bottom of FIG. 11 shows that there can be small as well as large juxtaposed clustered colorant dots. At a very large surface coverage of one colorant, the juxtaposed clustered colorant dots of neighboring screen elements may touch each other. For printing technologies such as rotogravure, there should be always a small space called "cell wall" between the rotogravure cells which are formed at the positions of the active pixels within a screen element. In addition the simultaneous presence of large and small clustered dots would yield large and small gravure cells that create instability in the reproduction of the colors. For rotogravure it is preferable to have fluorescent halftone dots of similar sizes. The requirement is therefore (a) to keep the juxtaposed approach ensuring that colorant dots are printed side by side, thereby avoiding quenching and shadowing effects and (b) to ensure that the juxtaposed clustered dots shown at the bottom of FIG. 11 are themselves halftoned as clusters of dispersed dots formed by dispersed segments which upon laser engraving yield gravure cells that are separated by walls.

Figure 12:
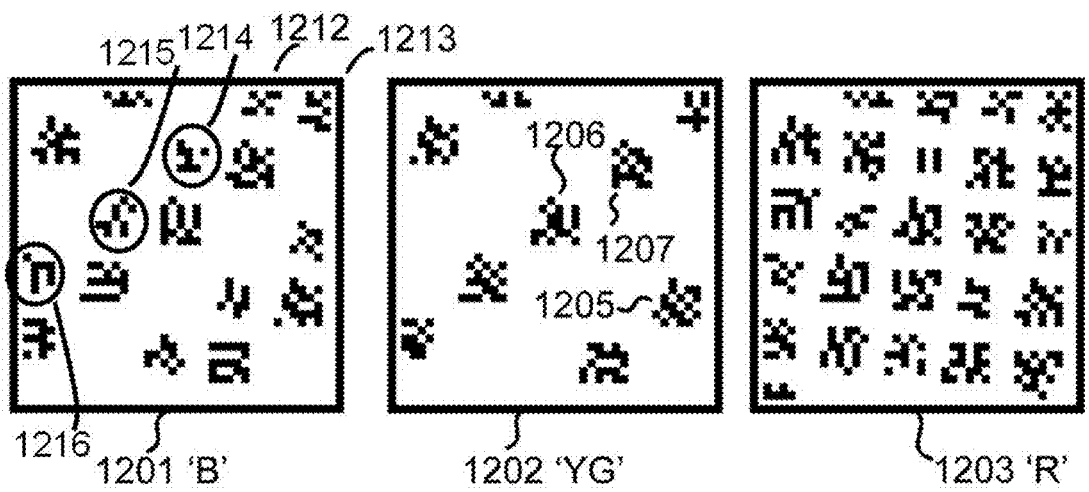
FIG. 12 shows the juxtaposed dispersed dot ink halftone separations obtained by applying dispersed dot halftoning to the juxtaposed clustered dot ink halftone separations shown at the bottom of FIG. 11, with the ink halftone separations 1201 (B: blue), 1202 (YG: yellow-green), and 1203 (R: red) showing juxtaposed clusters (e.g. 1214, 1215, 1216) of densely spaced pixel segments.
Figure 14:
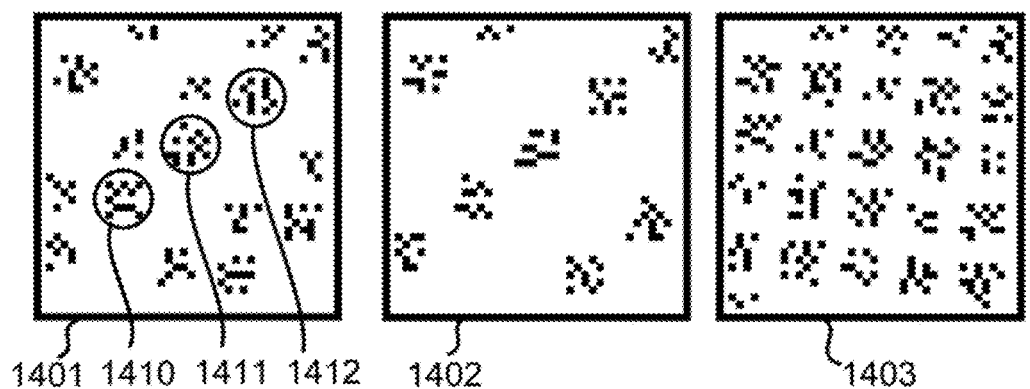
FIG. 14 shows the juxtaposed dispersed halftone obtained from a grayscale juxtaposed clustered dot shown in FIG. 13 by applying error diffusion with random thresholds, yielding the juxtaposed clusters of densely spaced pixel segments (e.g. 1410, 1411, 1412)

FIG. 12 shows the three ink separation layers 1201, 1202 and 1203 with their clusters of densely spaced pixel segments placed within the same space as the juxtaposed clustered dots from which they derive (FIG. 11, 1115, 1116, 1117) but in addition halftoned as juxtaposed dispersed dots. The blue dispersed halftone separation layer 1201 is derived from the clustered dot layer 1115 in FIG. 11. The yellow-green (YG) dispersed halftone separation layer 1202 is derived from the clustered dot layer 1116 in FIG. 11 and the red dispersed halftone separation layer 1203 is derived from the clustered dot layer 1117 in FIG. 11. Note that the active dispersed pixel segments shown in FIG. 12 and FIG. 14 as black pixels indicate the location of rotogravure cells, which at printing time will be filled by the fluorescent ink. In the case of offset printing, they indicate the positions of the ink accepting areas within the offset plate. In the case of electrophotography, they indicate the locations on the photoconductor where toner particles will be attracted. In the case of inkjet printing, they define the locations of the ink on the substrate (paper).

Generation of the Juxtaposed Dispersed Dot Ink Halftone Separations

Figure 13:
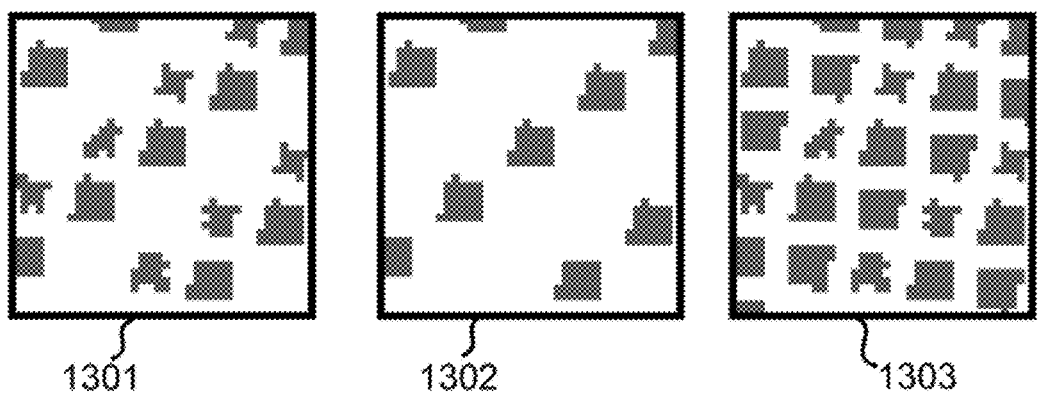
FIG. 13 shows the same juxtaposed clustered dot ink halftone separations as at the bottom of FIG. 11, but after having reduced the ink level of the juxtaposed clustered dot according to a ink level reduction factor of 60%.

The dispersed dot ink halftone separations shown in FIG. 12 are generated as follows. The juxtaposed clustered dot ink halftones are considered to be gray scale images, with the black dots being subjected to a reduction in ink level expressed by an ink level reduction factor ($r_d$) used for dispersed halftoning. As an example, the ink level of the inks (FIG. 11, 1115, 1116, 1117) is reduced by the ink level reduction factor of $r_n$=0.6, yielding the gray clustered dots shown in FIG. 13. These gray dots have exactly the same layout as the clustered dots shown in FIG. 11, bottom, but instead of having an ink level of 1 (totally black), they have an ink level of 0.6.

In order to obtain juxtaposed dispersed dot ink halftone separations, these juxtaposed ink level reduced gray clustered dots are halftoned with a halftoning algorithm yielding dispersed dots, preferably a variant of error-diffusion. This yields the dispersed dot halftone ink separations of FIG. 12.

An efficient implementation consists in generating for each ink layer a separate dispersed dot layer with a dispersed dot halftone at the correct ink level reduction, e.g. 60%. This separate halftone layer is generated from a uniform layer at 60% ink level by an error-diffusion procedure, working at a pixel resolution that corresponds to the required size of the rotogravure cells. In this separate halftone layer, there is on average 60% of active pixels (shown in the figures as black pixels). For example, one may work at a resolution of 1024 dpi, yielding pixels of size 24.8 µm. Other resolutions are also possible, depending on the type of the considered rotogravure printer. After performing the halftoning, the resulting separate dispersed dot structure is resampled to the resolution that was used for juxtaposed clustered dot halftoning. Then, a logical "AND" is performed between the juxtaposed clustered dot ink separation layer and the separate dispersed dot ink level reduced halftone layer. This yields the juxtaposed dispersed dot ink separation layers of FIG. 12 that are used for creating for example by laser engraving the cells of the rotogravure cylinder.

Different dispersed halftone ink level reduction factors generate different juxtaposed dispersed dot halftones. For example; with an ink level reduction factor of 40%, the dispersed dot halftone, within its cluster, comprises only 40% of black pixels, see FIG. 14.

The dispersed halftone ink level reduction factor $r_d$ is obtained by the multiplication of a rotogravure reduction factor $r_g$ and a fluorescence reduction factor $r_f$. The rotogravure reduction factor $r_g$ expresses the fact that a printed solid ink layer is obtained by rotogravure cells that cover only a part of the full surface. The rotogravure printing process requires walls between neighboring rotogravure cells that are engraved into a rotogravure cylinder. The black (active) pixels in FIG. 12 or FIG. 14 indicate the locations of the rotogravure cells. These cells are bordered by side walls, represented by white (non-active) pixels.

Figure 15:
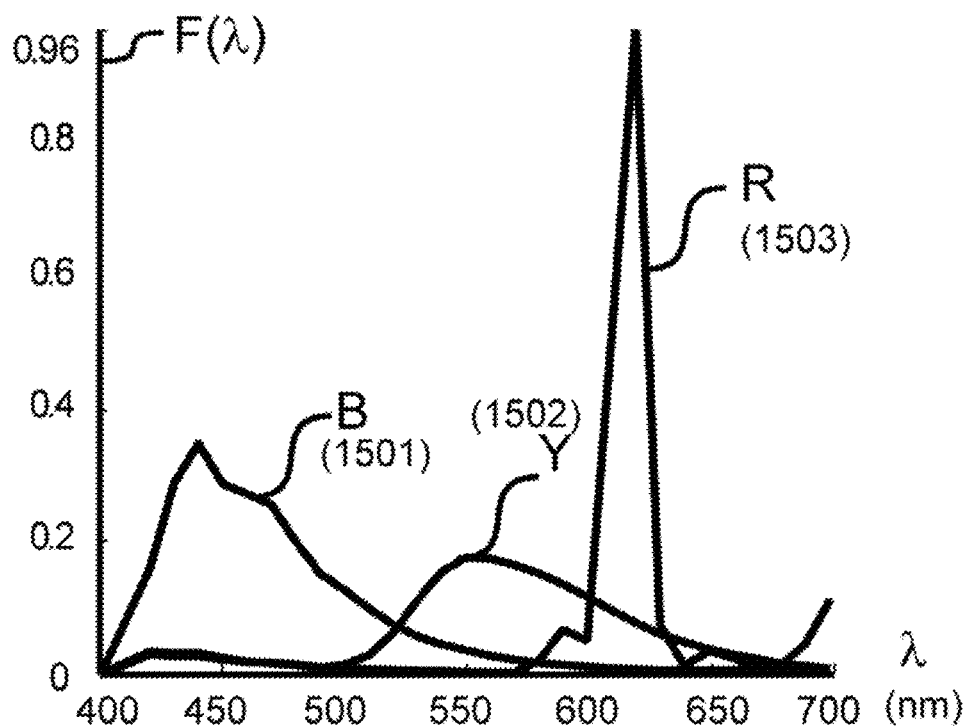
FIG. 15 shows the emission spectra of printed full-tone fluorescent inks (fluo blue ink: 1501, fluo yellow-green ink 1502 and fluo red ink 1503) without fluorescence reduction.
Figure 16:
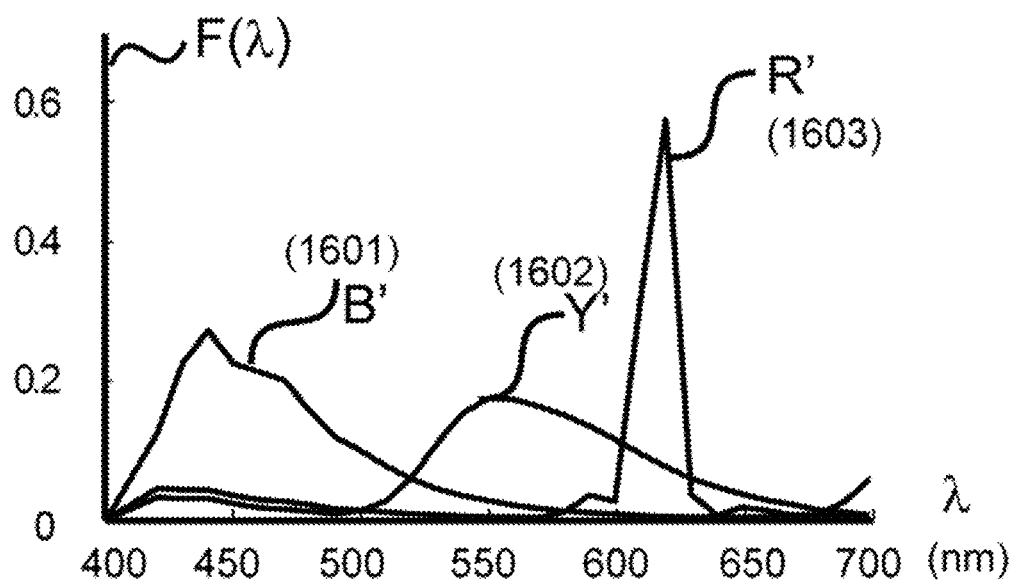
FIG. 16 shows the emission spectra of the same fluorescent inks, but with fluorescence reduction factors of 0.625 for the red fluorescent ink and of 0.85 for the blue fluorescent ink.

The fluorescence reduction factor is necessary in case of a fluorescent invisible ink having a stronger fluorescence, compared with the other fluorescent inks. FIG. 15 shows without fluorescent reduction the emission spectra of printed full-tone fluorescent inks obtained with a rotogravure reduction factor of 60% for each fluorescent ink (fluo blue ink: 1501, fluo yellow-green ink 1502 and fluo red ink 1503). The emission spectrum of the red fluorescent ink is much higher than the emission spectra of the other blue and yellow-green fluorescent inks. Therefore, it needs to be reduced by an appropriate fluorescence reduction factor. This factor is obtained by fitting it with a fluorescent color prediction model in order to obtain for the overlay of the three fluo red, yellow-green and blue ink dispersed halftones, all printed with the 60% rotogravure reduction factor, the white colorant, i.e. a colorant with a high CIELAB L* value and close to zero a* and b* values. The resulting red fluorescence reduction factor has been found to be 3/8=62.5%. In a similar manner, for the fluo blue ink, the blue fluorescence reduction factor is 85%. The resulting emission spectra are shown in FIG. 16 with the fluorescent blue ink 1601, the fluorescent yellow-green ink 1602 and the fluorescent red ink 1603. Since the dispersed halftone ink level reduction factor is the multiplication of the rotogravure reduction factor and a fluorescence reduction factor, we obtain in our example for the red ink a dispersed halftone ink level reduction factor of 0.6*0.625=0.375, i.e. 37.5%. For the blue ink, the dispersed halftone ink level reduction factor is 0.6*0.85=0.51, i.e. 51%. For the yellow-green ink, the dispersed halftone ink level reduction factor comprises only the rotogravure reduction factor and is therefore 60%. The fact that different ink level reduction factors can be applied for dispersed halftoning of different fluorescent ink layers ensures the creation of colorants having optimal gray and white tones.

In one embodiment, on may directly build the screen element library with the juxtaposed dispersed dot colorant halftones by storing them according to their surface coverages after having applied dispersed dot halftoning to the generated juxtaposed clustered dot halftones.

In another embodiment, one may first construct the colorant juxtaposed clustered dot halftone element library. Then, when creating the juxtaposed dispersed dot ink separation halftone layers in the output halftone space defining for example the cells to be engraved into the gravure cylinder, the step of carrying out dispersed dot halftoning according to the calculated dispersed halftone ink level reduction factor is performed. In addition, it is possible to introduce a dispersed halftone ink level reduction curve $r_d(q_j)$ that depends on the surface coverages $q_j$ (1701) of the ink j, see FIG. 17, 1703.

Figure 17:
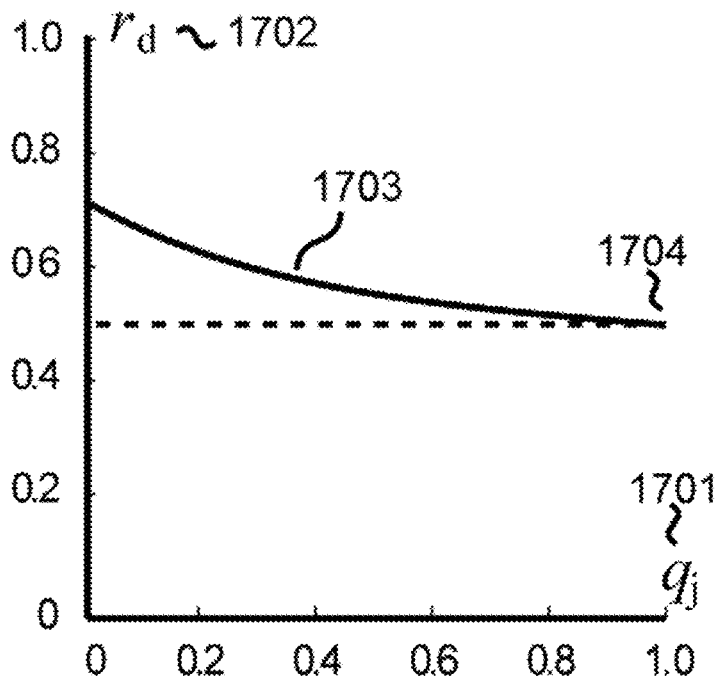
FIG. 17 shows a dispersed halftone ink level reduction curve 1703 that varies as a function of the surface coverages 1701 of the corresponding ink.

In the example of FIG. 17, the dispersed halftone ink level reduction factor at 100% surface coverage is 50% (1704) and at small input surface coverages, the dispersed halftone ink level reduction factor is between 60% and 70%. The dispersed halftone in level reduction curve 1703 shows that at small nominal input surface coverages, the dispersed halftone ink level reduction factors are less pronounced than at large nominal input surface coverages. This reproduction curve can be established for example by printing at 10%, 25% and 50% white colorant surface coverages a number of patches with dispersed halftone ink level reduction factors associated to each of the inks varying in small steps and select the dispersed halftone ink level reduction factors that yield the best gray values, either measured as emission spectra and converted to CIELAB or estimated by having an observer viewing the corresponding patches under UV.

Error-Diffusion with Random Thresholding

Figure 27:
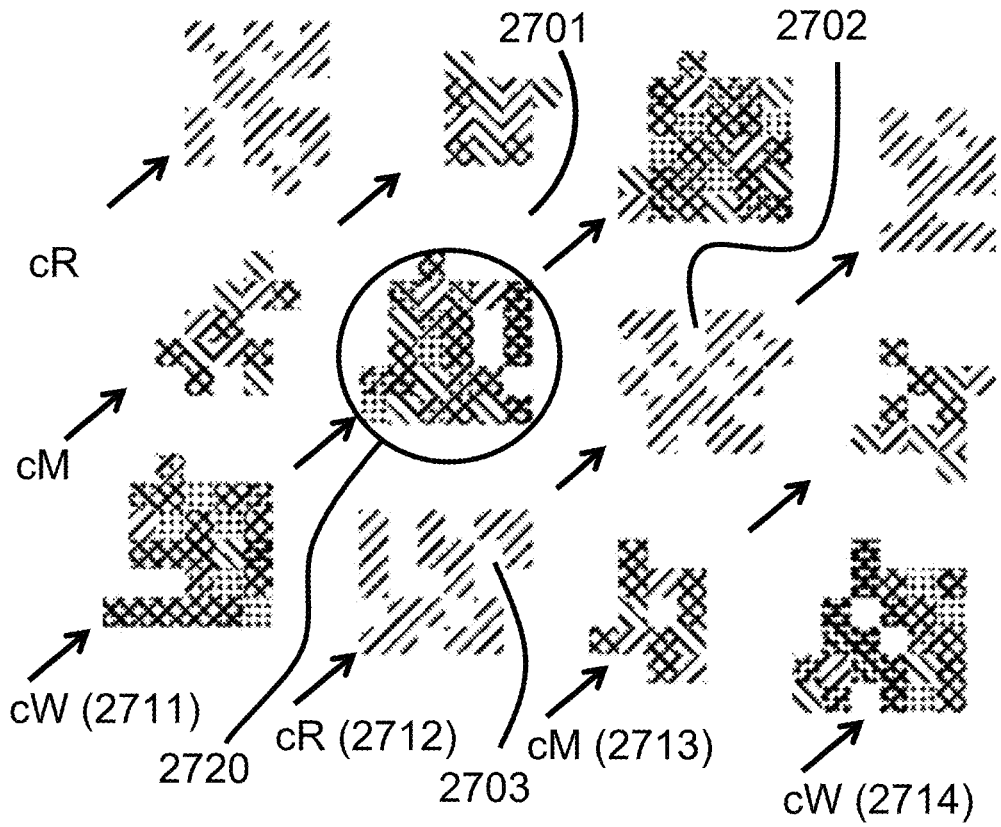
FIG. 27 shows an example of overlay of juxtaposed dispersed dot ink halftones where the diagonally laid out clusters of dispersed colorant dots are formed of pixels having no ink 2702, one ink, two inks and three inks and where unprinted areas 2701 surround these clusters.

The special error diffusion technique aims at creating juxtaposed dispersed dot colorant halftones by overlays of ink-specific clusters of dispersed pixel segments (FIG. 12, 1201 for the blue ink, 1202 for the yellow-green ink and 1203 for the red ink), which are, within the area of the corresponding juxtaposed clustered colorant dots, partly overlapping and partly non-overlapping (FIG. 27). This is achieved by a modified error diffusion algorithm called "random threshold error diffusion". This algorithm ensures that halftones having the same surface coverages are halftoned each time differently thanks to a random threshold generator.

In the next paragraphs, we describe the layout of the red, yellow-green and blue ink dispersed dot halftones. These ink halftones are formed by the corresponding ink-specific juxtaposed clusters of densely spaced pixel segments, generated by random threshold error diffusion.

The juxtaposed clustered dots of FIGS. 11, 1125, 1126 and 1127 have exactly the same spatial layout. However, after dispersed dot halftoning by random threshold error diffusion with 60% dispersed halftone ink level reduction, the resulting dispersed "YG" halftones shown in FIGS. 12, 1205, 1206 and 1207 have all different layouts of the dispersed dot halftone. The randomness in dispersed dot halftone layout ensures that the overlay of multiple ink halftones for printing with fluorescent colorants does not result in undesired moirés. For the example of the halftone shown in FIG. 10, enlargement 1011, we show in FIG. 18 the overlay of the fluorescent blue (halftone 1201) and red (halftone 1203) ink halftone layers. In similarity with FIG. 11 top view 1100, the locations of the fluorescent red colorant dots "cR" are marked as 1801a, 1801b, 1801c, the locations of the magenta colorant dots "cM" are marked 1802a and 1802b and the locations of the white colorant dots "cW" are marked as 1803a, 1803b, 1803c. For the red colorant, present in diagonals 1801a, 1801b or 1801c, there is only the red ink dispersed halftone. It is represented by a positively oriented diagonal hatching. For the magenta colorant "cM" present in diagonals 1802a and 1802b, both the red ink halftone and the blue ink halftone are present. The blue ink halftone is represented by a negatively oriented diagonal hatching. One can verify that at the positions of the fluorescent magenta colorant "cM", parts of the pixels are red only (positive diagonals), parts of the pixels are blue only (negative diagonals), parts of the pixels have superposed red and blue inks and parts of the pixels are unprinted. This independence of the red and blue ink halftones ensures that the overlay does not yield undesired local moirés and that small local positioning inaccuracies of the dispersed ink halftones do not modify the color of the printed halftone.

Figure 18:
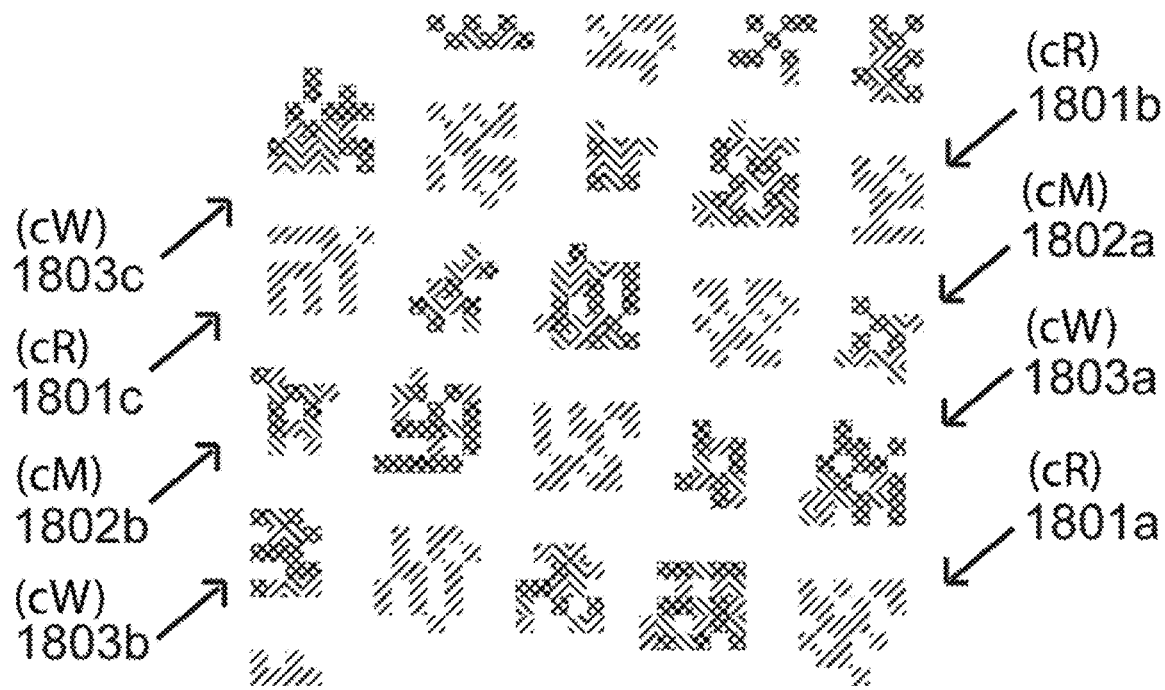
FIG. 18 shows schematically the overlay of the fluorescent blue ink and red ink juxtaposed dispersed dot halftone separations obtained by random threshold error diffusion, where the resulting clusters of juxtaposed dispersed colorant dots comprise areas of no ink, one ink and two inks.
Figure 19:
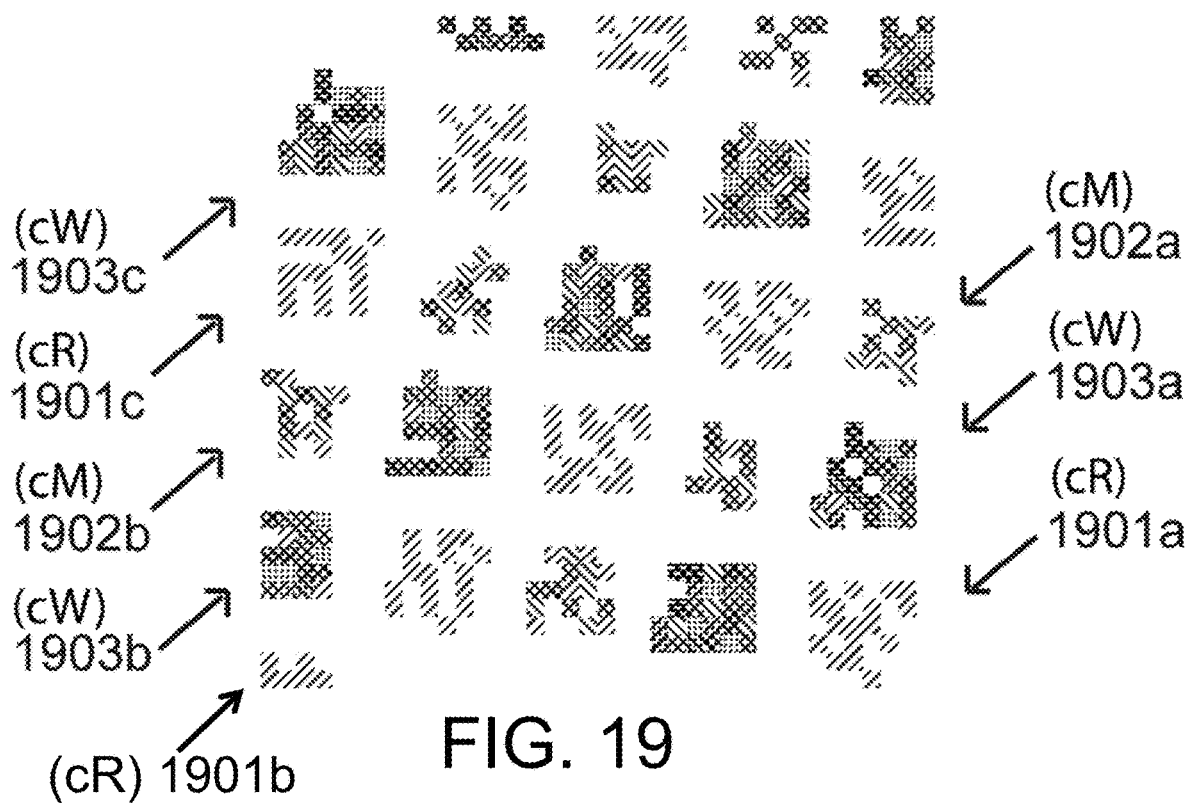
FIG. 19 shows schematically the overlay of the fluorescent blue ink, yellow-green ink and red ink juxtaposed dispersed halftone separations obtained by random threshold error diffusion where the clusters of juxtaposed dispersed colorant dots comprise areas of no ink, one ink, two inks and three inks.

In analogy with FIG. 18, FIG. 19 shows the same halftone patch as in FIG. 11, 1100 with all overlaid ink halftone separation layers. In addition to the inks present in FIG. 18, the presence of the yellow-green ink is marked by a dot pattern array. On the dots forming the white colorant "cW" (1903a, 1903b, 1903c), one can verify that some of the pixels remain unprinted, some are printed by one ink (positive diagonals, negative diagonals or dot array), some are printed by two inks (two types of diagonals or one type of diagonals and dot array) and some are printed by three inks (two types of diagonals and one dot array). The independence between the dispersed dot layouts of the three ink halftone layers ensures that no local moiré occurs and that small local positioning inaccuracies between the overlaid ink halftones do not result in a modification of the produced colors. Therefore, printing with juxtaposed dispersed dots generated by random threshold error diffusion ensures a robust and stable behavior of the fluorescent color reproduction framework.

Figure 20:
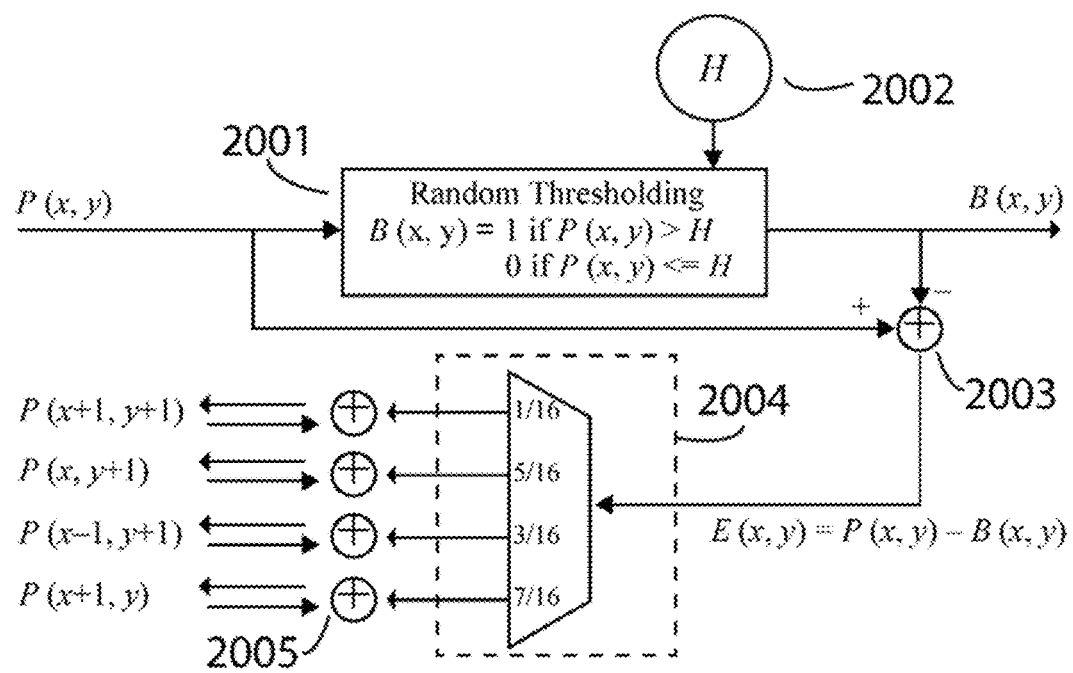
FIG. 20 shows schematically the components or steps of random threshold error-diffusion, with H (2002) being the random threshold generator.

The random-thresholding error diffusion procedure that produces the juxtaposed dispersed dot ink halftones shown above and in FIGS. 12, 14, 18 and 19 is illustrated in FIG. 20. It comprises a random threshold generator 2002 that generates the threshold H that is used for the decision 2001 if a pixel needs to be activated (e.g. pixel to be set to "1" representing a black pixel) or needs to be deactivated (e.g. pixel to be set to "0", representing a white pixel). The error computation step 2003 calculates the error which is the difference E(x,y) between the normalized input pixel ink level value P(x,y) and the output ink level value B(x,y) which is zero (deactivated) or one (activated). The error distribution step 2004 distributes the error to the direct and indirect neighbor pixels which have not yet been processed. In order to compensate for the error, each of these neighboring pixels adds its fraction of the received error to its current ink level. In a preferred embodiment, neighbor pixels P(x+1,y+1), P(x,y+1), P(x−1,y+1), and P(x+1,y) receive fractions $1/16$, $5/16$, $3/16$ and $7/16$, respectively, of the error E(x,y). Good results have been obtained with a generated random threshold H uniformly distributed in the interval between 0.1 and 0.9. Other intervals are also possible, e.g. 0.2 to 0.8 or 0.3 to 0.7.

Color Prediction Model for Invisible Fluorescent Prints Illuminated Under UV Light A color prediction model for predicting the color of invisible fluorescent inks illuminated under UV illumination is detailed in U.S. Pat. No. 8,085,438 to Hersch et al., also inventor in the present disclosure. It relies on the Yule-Nielsen corrected spectral Neugebauer prediction model, adapted to spectra emitted by fluorescent ink halftones. It is given by formula (16):

$$F_h(\lambda) = \left( \sum_{i=1}^{m} u_i \cdot F_i^{1/n}(\lambda) \right)^n \quad (16)$$

where $F_i(\lambda)$ is the emission spectrum of colorant i, $u_i$ is the effective surface coverage of colorant i, m is the number of colorants contributing to the fluorescent halftone and where the scalar exponent n is fitted so as to minimize the sum of square differences between predicted and measured emission spectra components.

Formula (16) predicts the emission spectrum $F_h(\lambda)$ of a halftone formed by a number m colorants whose full tone emission spectra $F_i(\lambda)$ have been measured. The ink spreading curves mapping nominal to effective surface coverages of the colorants are obtained by applying formula (16) separately to each single colorant and for different nominal surface coverages, e.g. 0.25, 0.5, and 0.75. The corresponding effective surface coverages are fitted by minimization of a difference metric between predicted emission spectrum and measured emission spectrum. A possible difference metric is the square of the Euclidian distance between the two spectra, expressed as vectors with discrete spectral components (e.g. 400 nm to 700 nm in steps of 10 nm).

Exponent n is obtained by predicting according to formula (16) the emission spectra of halftones at combinations of zero, 0.5 and fulltone colorant surface coverages. A value of n is selected that minimizes over the considered samples a difference metric between the predicted and the measured emission spectra. In U.S. Pat. No. 8,085,438, for the case of offset printing with fluorescent inks on paper without fluorescent brighteners, the proposed value is n=0.93.

Fluorescent emission spectra predicted according to formula (16) are converted to CIE-XYZ colorimetric values and then to CIELAB, see for example U.S. Pat. No. 8,085,438 to Hersch et al. The resulting colorimetric CIELAB values express the predicted fluorescent color. Fluorescent emission prediction by mapping nominal to effective surface coverages of the colorants and by applying formula (16), followed by the calculation of the corresponding fluorescent emission color by conversion to CIE-XYZ and then to CIELAB forms the color prediction model. It maps nominal surface coverages of the fluorescent colorants to CIELAB colors. A desired CIELAB color located within the fluorescent color gamut can be obtained by using this color prediction model to fit the nominal surface coverages of the considered colorants. When printed as halftones, the fitted surface coverages will yield under UV illumination the desired CIELAB color.

Creation of the Fluorescent Emission Gamut

Constructing the fluorescent emission gamut is carried out by considering many possible combinations of surface coverages of the selected colorants. In the example where we consider the fluorescent colorants blue ("B"), yellow-green ("YG"), red ("R"), magenta ("M") and white ("W"), and in the case of juxtaposed halftone dots comprising up to three colorants (FIG. 4), the gamut is formed by many possible combinations of surface coverages of the three colorants selected from the 5 available colorants. In the case of juxtaposed halftone dots comprising up to four colorants (FIGS. 24A, 24C and 25), the gamut is formed by many possible combinations of surface coverages of the four colorants selected from the available colorants. One may for example consider variations in steps of 5%. All these predicted colors form color points within the 3D space determined by the L*, a* and b* coordinates of CIELAB.

The possibly non-convex gamut boundary is obtained by first performing a Delaunay tetrahedrization of the predicted CIELAB color points and then by computing with the B all-Pivoting algorithm the set of surface triangles defining the possibly concave gamut boundary. The Ball Pivoting algorithm is described in the publication by F. Bernardini, J. Mittleman, H. Rushmeier, C. Silva, and G. Taubin, The Ball-Pivoting Algorithm for Surface Reconstruction, IEEE Trans. Visualization and Computer Graphics, Vol. 5, No. 4, pp. 349-359 (1999).

Mapping the Display Gamut into the Fluorescent Emission Gamut

In addition to the establishment of the 3D fluorescent emission gamut, the gamut formed by input image colors, also known as display colors, should also be created. Most RGB color images are specified in a display color coordinate system such as the standard sRGB display color coordinate system. We therefore built the gamut in CIELAB formed by sRGB displayable colors. This sRGB gamut is created by considering all combinations of sRGB red, green and blue values from 0 to 1, e.g. in steps of 0.02 yielding in total 132'651 colors. These sRGB colors are converted to CIE-XYZ and then to CIELAB colorimetric values, as known in the art. The sRGB gamut is formed in the CIELAB space by the convex hull of these color values.

Figure 21A:
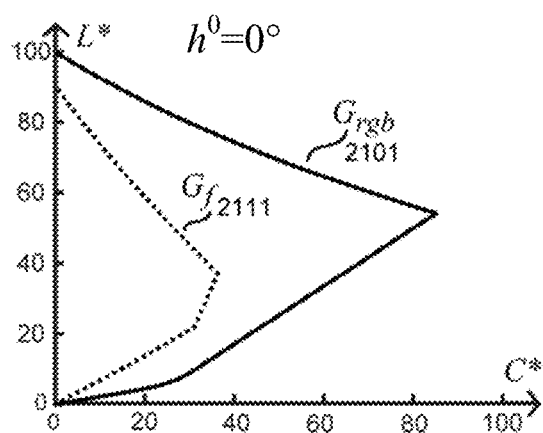
FIGS. 21A, 21B and 21C show CIELAB L*C* slices across the sRGB ($G_{rgb}$) and the fluorescent ($G_f$) colorant gamuts, at hue angles $h°=0°$, $h°=120°$ and $h°=240°$, respectively.
Figure 21B:
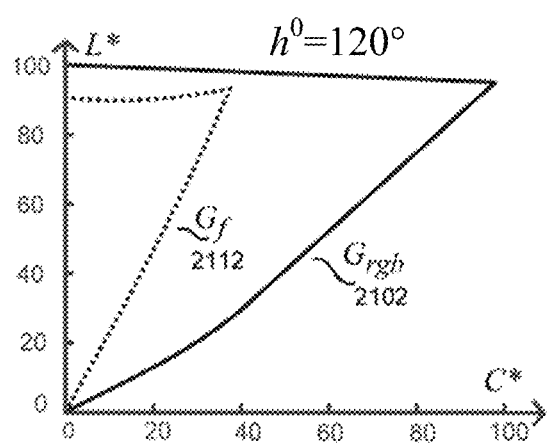
Figure 21C:
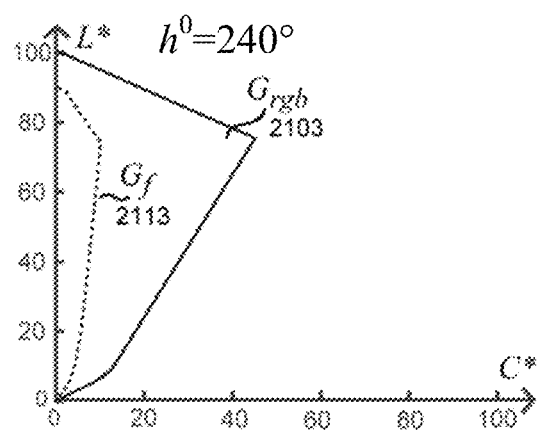
Figure 23:
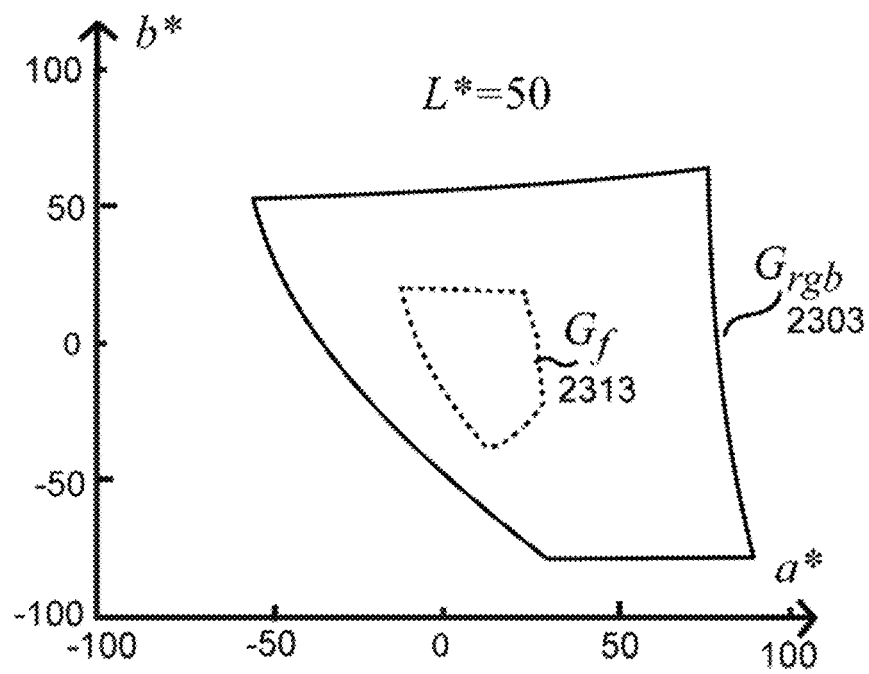
FIG. 23 shows in CIELAB a slice parallel to the a*b* plane, at lightness L*=50, through the sRGB ($G_{rgb}$) and the fluorescent emission gamuts ($G_f$)

FIGS. 21A, 21B and 21C show in the CIELAB 3D space lightness-chroma (L*C*) slices through the fluorescent emission gamut $G_f$ (2111, 2112, 2113) and through the sRGB gamut G RGB (2101, 2102, 2103). FIG. 21A shows a slice at the hue angle of zero degrees, with the chroma axis C* being the a* axis. FIG. 21B shows another L*C* slice at the hue angle of 120 degrees. FIG. 21C shows a further L*C* slice at the hue angle of 240 degrees. The hue angle $h^0$ is defined as $h^0$=a tan 2(b*,a*). We also have a*=C*cos($h^0$) and b*=C*sin($h^0$). As a complement, FIG. 23 shows a horizontal slide parallel to the a* b* plane at lightness L*=50 through the sRGB ($G_{rgb}$) and the fluorescent emission ($G_f$) gamuts.

The goal is to reproduce as invisible fluorescent images viewable under UV light the colors present in classical digital images, such as the images acquired by digital or smartphone cameras. For this purpose we perform gamut mapping, i.e. we map colors present in the sRGB gamut into colors present in the fluorescent emission gamut. This ensures that classical digital images can be printed as invisible fluorescent images and viewed under UV illumination as fluorescent emission color images.

For gamut mapping, we map the colors present in the sRGB gamut $G_{rgb}$ into the fluorescent emission gamut $G_f$ according to the following rules. Optionally, we map the lightness range of the sRGB gamut into the lightness range of the fluorescent emission gamut. Then we map the chroma and the lightnesses of the sRGB colors into the fluorescent emission gamut, as explained in FIG. 22.

Figure 22:
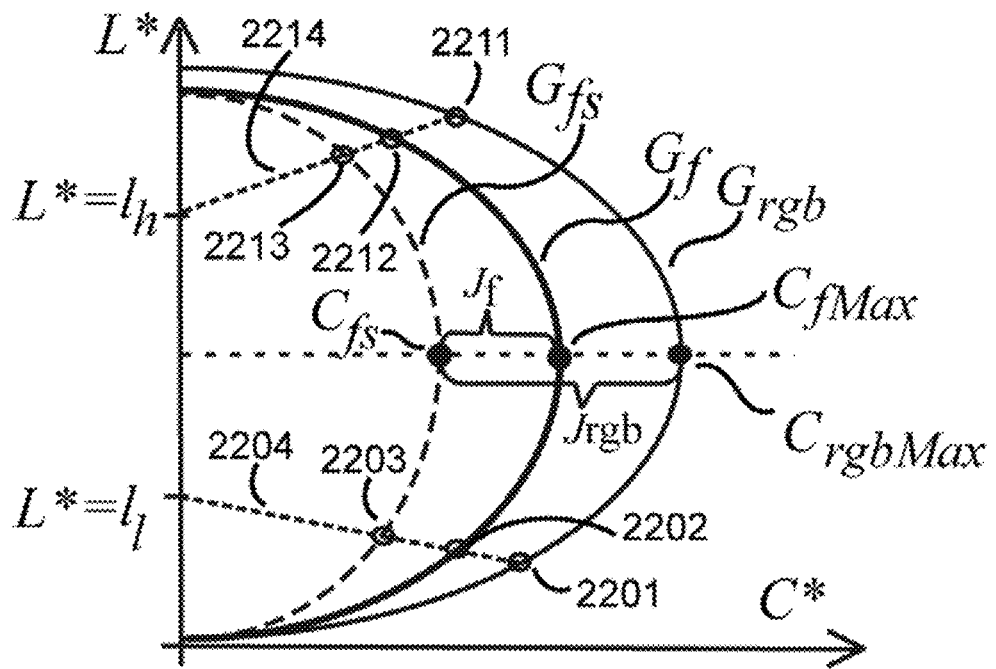
FIG. 22 shows schematically a lightness-chroma slice through both the sRGB ($G_{rgb}$) and the fluorescent emission ($G_f$) gamuts, illustrating a preferred mapping of the sRGB gamut into the fluorescent colorant emission gamut.

FIG. 22 shows schematically a lightness-chroma slice through both the sRGB ($G_{rgb}$) and the fluorescent emission ($G_f$) gamuts at the hue angle $h^0$ of the currently considered input color. The preferred gamut mapping method consists in considering the sub-gamut of the sRGB gamut described by the $J_{rgb}$ interval and bordered by the $G_{rgb}$ and the $G_{fs}$ boundaries, named [$G_{rgb}$, $G_{fs}$]. This sRGB sub-gamut is mapped into the fluorescent emission sub-gamut described by the $J_f$ interval and bordered by the boundaries of the $G_f$ gamut and of the $G_{fs}$ sub-gamut. This sub-gamut is named [$G_f$, $G_{fs}$]. The $G_{fs}$ sub-gamut is bounded by its $G_{fs}$ gamut boundary. It is constructed by bringing the $G_f$ gamut boundary closer to the lightness axis. For this purpose, chroma values are reduced by a certain factor α, e.g. α=80%. At the lightness interval between lightnesses L*=$l_l$ and L*=$l_f$, the mapping of a color with chroma $C_{rgb}$ within the sRGB [$G_{rgb}$, $G_{fs}$] sub-gamut and at lightness L* into a fluorescent emission color $C_f$ within the fluorescent emission sub-gamut [$G_f$, $G_{fs}$] is carried out according to the following formula:

$$C_{fs}(L^*) = \alpha C_{fMax}(L^*) \quad (17)$$

$$C_f(L^*) = C_{fs}(L^*) + \frac{C_{rgb}(L^*) - C_{fs}(L^*)}{C_{rgbMax}(L^*) - C_{fs}(L^*)} \cdot (C_{fMax}(L^*) - C_{fs}(L^*)) \quad (18)$$

where $C_{fmax}(L^*)$ and $C_{rgbMax}(L^*)$ express the respective maximal chroma values at the lightness value L* and the hue $h^0$ of the color to be mapped. The mapping is carried out along a horizontal ray, i.e. the mapped sRGB color has the same lightness L* and hue $h^0$ as the input color.

At lightnesses between L*=0 and L*=$l_l$, sRGB colors are gamut mapped in the same manner as in the lightness interval between L*=$l_l$ and L*=$l_f$, but along an oblique ray 2204 connecting the current sRGB color to the achromatic color LAB=($l_l$,0,0). On this oblique ray, sRGB colors on the sRGB interval 2201_2203 are mapped onto colors on the fluorescent emission interval 2202_2203.

At lightnesses above L*=$l_h$, sRGB colors are gamut mapped in the same manner as in the lightness interval between L*=$l_l$ and L*=$l_f$, but along an oblique ray 2214 connecting the current sRGB color to the achromatic color LAB=($l_h$,0,0). On this oblique ray, sRGB colors on the sRGB interval 2211_2213 are mapped onto colors of the fluorescent emission interval 2212_2213. If no lightness mapping occurs, display sRGB colors located within the $G_{fs}$ gamut boundaries remain at their original LAB coordinate. If lightness mapping occurs, only their lightness values change.

Table Associating Input Image Colors (Display Colors) to Surface Coverages of the Fluorescent Colorants Once the display colors (e.g. sRGB colors) have been mapped into the gamut $G_f$ formed by the fluorescent colorants, one can establish the table associating input display colors such as sRGB values to nominal surface coverages of the fluorescent colorants. Due to the tetrahedrization of the fluorescent colorant gamut, each sRGB color mapped into the fluorescent gamut is located within a tetrahedron. The goal is to represent the current sRGB color by a fluorescent halftone color. In our example, we first search for the tetrahedron enclosing the gamut mapped sRGB sample. In case all the vertices of this tetrahedron incorporate the same set of colorants, the colorant surface coverages associated to the current sRGB value are obtained by a linear combination (also known as barycentric interpolation) of the surface coverages of the colorants forming the tetrahedron's vertices, as known in the art (see I. Amidror, Scattered data interpolation methods for electronic imaging systems: a survey, Journal of Electronic Imaging Vol 11, No 2, pp. 157-176, April 2002). These colorant surface coverages are inserted into the table mapping sRGB values to nominal colorant surface coverages. In case the current sample is within a tetrahedron whose vertices comprise colorants that differ from one vertex to the next, then for the case of three-colorant juxtaposed halftones (FIG. 4), try successively each triplet of colorants present in these vertices and fit their surface coverages with the color prediction model so as to obtain a CIELAB value as close as possible to the CIELAB value of the current gamut mapped sRGB value. The triplet of colorants yielding the smallest color difference is selected and its fitted surface coverages are inserted into the table mapping sRGB values to colorant surface coverages. In the case of juxtaposed dispersed dot halftoning with 4 colorant halftones, the same procedure applies, but instead of triplets of colorants, one can consider quadruplets of colorants.

Extension of Juxtaposed Dispersed Dot Halftoning to 4 or More Colorant Halftones The section "Generation of juxtaposed clustered dot halftones" showed the generation of juxtaposed clustered dot halftones for the case where each screen element comprises 3 fluorescent colorants, in addition to the unprinted paper which is black under UV illumination. In the present section, we show how to extend this juxtaposed halftoning scheme to 4 or more colorants. This can be advantageous when printing with more than 3 fluorescent inks. This extension also works for printing with three fluorescent inks.

Figure 24A:
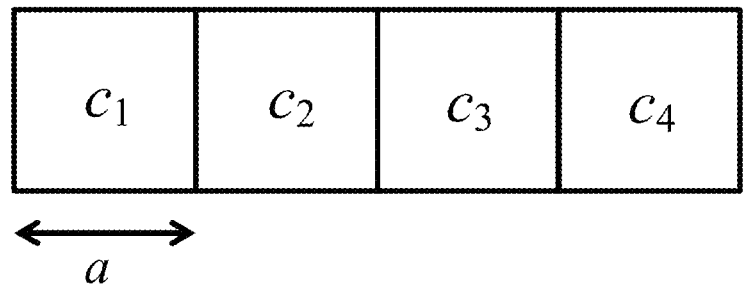
FIG. 24A shows the initial setup of a screen element comprising 4 colorant cells $c_1$, $c_2$, $c_3$, and $c_4$.

We assume that in the case of 4 inks, we have a juxtaposed screen element composed of 4 cells, each one being initially a square with side a (FIG. 24A). The total horizontal length of the 4 squares is 4α. Let us assume that the 4 colorants $c_1$, $c_2$, $c_3$, $c_4$ have surface coverages $s_1$, $s_2$, $s_3$, $s_4$, with $s_1+s_2+s_3+s_4 \leq 1$. The unprinted black surface part is $$s_{black} = 1 - s_1 - s_2 - s_3 - s_4 \quad (20)$$

In order to position the different colorants on the 4 screen cells, we calculate first their relative surface ratio $s_1'$, $s_2'$, $s_3'$, $s_4'$:

$$s_i' = \frac{s_i}{s_1 + s_2 + s_3 + s_4} \quad (21)$$

where $s_1'$ stands for $s_1'$, $s_2'$, $s_3'$ $s_4'$ and $s_i$ stands for $s_1$, $s_2$, $s_3$ $s_4$.

Figure 24B:
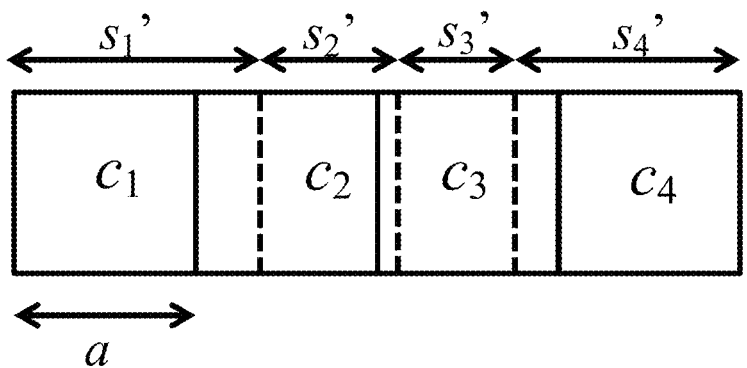
FIG. 24B shows how to segment the juxtaposed screen element space according to the ratio of surface coverages $s_1'$, $s_2'$, $s_3'$, and $s_4'$ of the' 4 contributing colorants.
Figure 24C:
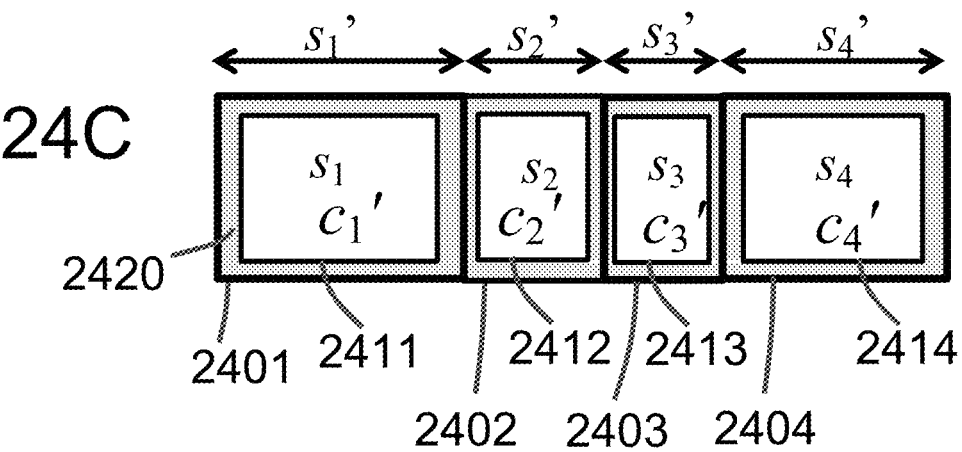
FIG. 24C shows the same screen element, after scaling down the resulting juxtaposed screen cells, thereby obtaining rectangular juxtaposed colorant dots $c_1'$, $c_2'$, $c_3'$, $c_4'$ surrounded by the surface 2420 representing the unprinted non-active substrate space that is black under UV illumination.

In order to place the colorants onto the juxtaposed screen element's 4 cells, we divide the juxtaposed screen element length $4\alpha$ into segments of length given by the colorant surface ratio $s_1'$, $s_2'$, $s_3'$ $s_4'$ see FIG. 24B. Then, in order to restore the black area between the colorants, the areas of the colorant rectangles are spatially scaled down by $s_1+s_2+s_3+s_4$ or, equivalently, their horizontal and vertical sides are scaled down by $\sqrt{s_1+s_2+s_3+s_4}$ and they are positioned centrally. As example, FIG. 24C shows the layout of the 4 colorants 2401, 2402, 2403 and 2404 having respective ratio of surface coverages $s_1'$, $s_2'$, $s_3'$ $s_4'$. Knowing for example that $s_1+s_2+s_3+s_4=0.8$, then $s_{black}=0.2$. Therefore rectangles 2401, 2402, 2403 and 2404 associated to the colorants $c_1$, $c_2$, $c_3$, $c_4$ have areas scaled down to 0.8, yielding the scaled down rectangles 2411, 2412, 2413 and 2414, of respective areas $s_1$, $s_2$, $s_3$, $s_4$, each positioned at the center of its corresponding non-scaled rectangle. The spaces (in gray, 2420) between the non-scaled and the scaled rectangles form the unprinted black colorant. The scaled down rectangles define the layout of the corresponding juxtaposed clustered colorant dots.

Figure 25:
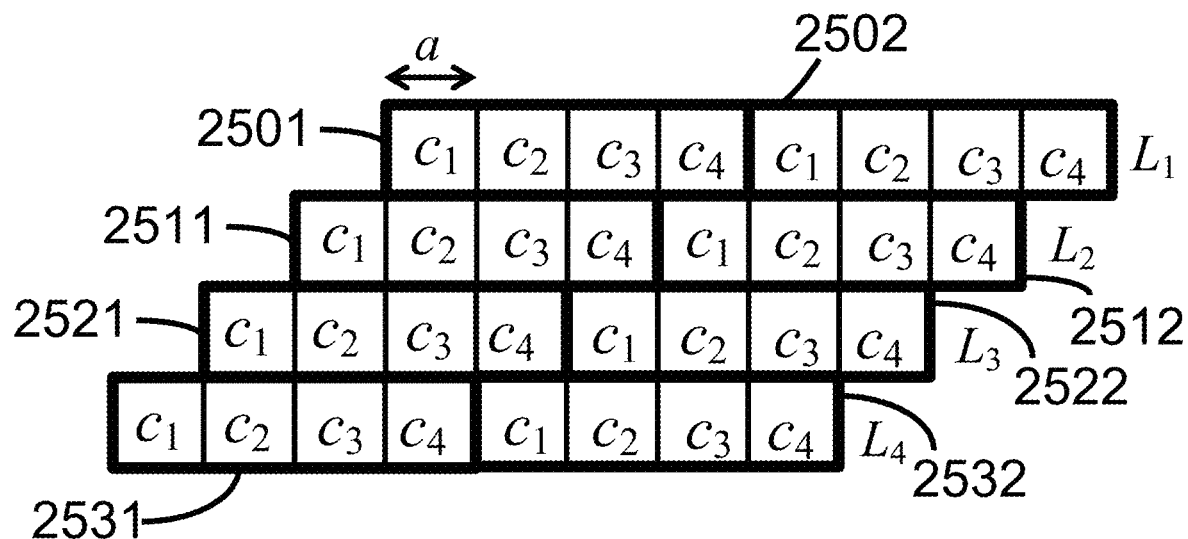
FIG. 25 shows how to arrange lines of screen elements having each 4 juxtaposed colorant cells.

Multiple adjacent juxtaposed screen elements are laid out by placing them side by side along the line of juxtaposed screen elements, e.g. FIGS. 25, 2501 and 2502. Vertically adjacent lines of juxtaposed screen elements (e.g. $L_1$ and $L_2$) are created by shifting each vertically adjacent screen element line by one initial cell of the screen element (FIG. 25, 2511, 2521).

Figure 26:
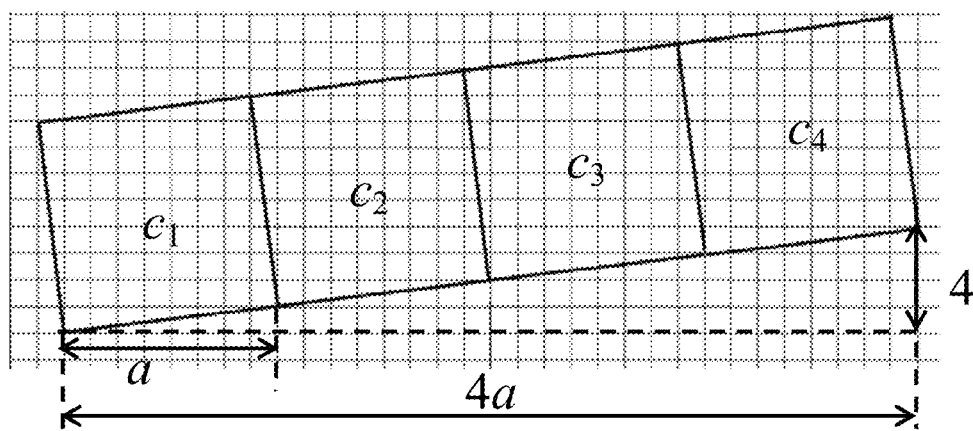
FIG. 26 shows the initial layout of an oblique screen element tile having four juxtaposed colorant dots.

As mentioned previously, to create raster screen elements having a surface close to the surface of their respective rectangles (rectangles defining the surfaces $s_1$, $s_2$, $s_3$ and $s_4$: 2411, 2412, 2413, 2414), we need oblique rectangle borders. We rotate the juxtaposed screen element (FIG. 24C) by preferably an angle of a tan(1/a) from the horizontal. In the example of FIG. 26, the horizontally laid out juxtaposed screen element of FIG. 24A of cell size a=8 is enlarged by $s=(\sqrt{a^2+1})/a$, and rotated by angle $\alpha=a \tan(1/a)=7.12$ degrees.

For a given set of colorant surface coverages $s_1$, $s_2$, $s_3$ and $s_3$, after having applied this rotation and scaling to all rectangles of the screen tile (e.g. FIG. 24C), we rasterize them, thereby obtaining the juxtaposed discrete clustered dots, construct the equivalent horizontal rectangular tile, apply dispersed dot halftoning and obtain the juxtaposed screen element library entry associated to the desired fluorescent colorant surface coverages $s_1$, $s_2$, $s_3$ and $s_4$.

In case that more than 4 colorants should be printed within a single screen element, one may extend the proposed juxtaposed halftoning by adding one more colorant in the row of colorants forming one juxtaposed screen element (e.g. add a colorant $c_5$ in FIG. 24A). The same method can also be applied in case of only 3 colorants per screen element. In that case, the base tile comprises cells $c_1$, $c_2$ and $c_3$.

Juxtaposed Dispersed Dot Halftoning: Preparation Phase and Ink Separation Halftoning Phase The preparation phase comprises the creation of the table mapping sRGB values to juxtaposed surface coverages of the colorants. It also comprises the creation of the juxtaposed clustered or dispersed dot screen element library. The preparation phase is generally needed once for a given printing environment comprising the selected inks, the selected additional colorants, as well as the printer dependent elements such as the gravure cylinder, the engraving technology and the rotogravure printer.

Generally, a printing session comprises within the output halftone space the creation of the target halftone ink separations that serve for engraving the cylinders, for imaging the offset plate, for creating the latent image on the photoconductor or, in case of ink-jet, for directly printing the target halftone ink separations on paper. At halftone ink separation halftoning time, the target halftone output space is scanned pixel by pixel and scanline by scanline. At each pixel, the corresponding location in the input image is found and its color, called input color, is read. Corresponding colorant surface coverages are obtained from the table mapping sRGB values to juxtaposed surface coverages of the colorants. With the colorant surface coverages, the corresponding entry in the juxtaposed dispersed dot screen library is accessed and, according to the current location in the halftone space, the pixel from the library is read out and its ink identifier bits placed onto the output ink halftone separations used for engraving the rotogravure cylinders, for imaging the offset plates, for creating the latent image on the photoconductor (electrophotography) or for printing on paper (inkjet).

In case that the juxtaposed screen library is made of clustered dots, an additional step consists in applying dispersed dot halftoning before placing the pixel ink identifier bits resulting from dispersed dot halftoning onto the output ink halftone separations.

Workflow for Fluorescent Color Reproduction

The method steps to be executed or equivalently the actions to be performed are either part of the preparation phase or of the target ink separation halftoning phase. Since the steps of the preparation phase are carried out unfrequently, their execution time is not critical. The ink separation halftoning phase is executed each time a set of new pages needs to be printed. Its execution time is therefore critical.

Preparation phase:

P1: Calibrating the fluorescent color prediction model, see Section "Color prediction model for invisible fluorescent prints illuminated under UV light". The nominal to effective surface coverages (ink spreading curves) are obtained, as well as the n-value of the fluorescent emission prediction model.

P2. Establishing the fluorescent print gramut, according to Section "Creation of the fluorescent emission gamut".

P3. Mapping the display gamut into the fluorescent print gramut, according to Section "Mapping the display gamut into the fluorescent emission gamut".

P4. Establishing the table mapping input display colors to surface coverages of the fluorescent colorants, according to Section "Table associating display colors to surface coverages of the fluorescent colorants".

P5. Creation of the juxtaposed screen element library, either based on juxtaposed clustered dots or based on juxtaposed dispersed dots, according to Sections "Generation of juxtaposed clustered dot halftones", "Equivalent horizontal rectangular screen tiles", "Juxtaposed screen element library" and "Generation of the juxtaposed dispersed dot ink halftone separations"

Target ink separation halftoning phase:

T1. Scanning the output halftone space pixel by pixel and scanline by scanline and at each current output location finding the corresponding input location in the input color image.

T2. Reading the color at that input location from the input color image.

T3. With the obtained color, accessing the table mapping display colors to fluorescent colorant surface coverages.

T4. With the obtained colorant surface coverages, access the juxtaposed screen element library. If the screen element library relies on clustered dots, apply to the obtained juxtaposed cluster dot halftone the dispersed dot halftoning procedure. Write the resulting pixel ink identifiers onto the current location of the output halftone ink separations. If the screen element library relies on dispersed dots, directly write the obtained pixel ink identifiers onto the current location of the output halftone ink separations.

In case that the juxtaposed dispersed dot halftones are produced by a computing system, software modules will be in charge of executing the actions mentioned in the present section. Each preparation task P1, P2, P3, P4 and P5 as well as each halftoning task T1, T2, T3, and T4 will be programmed as a specific software module. These software modules are executed on a computing system comprising at least one CPU, memory, mass storage and network connections to external devices such as the rotogravure cylinder engraving apparatus. The software modules are executed in the sequence described above.

Characterization of Typical Juxtaposed Dispersed Dot Halftones

Juxtaposed dispersed colorant dot halftones are characterized by diagonally laid out clusters of dispersed dots, surrounded by unprinted space (e.g. FIG. 27, 2701). FIG. 27 shows schematically arrangements of diagonally oriented clusters (e.g. 2720) of dispersed colorant dot halftones. FIG. 27 is an enlarged instance of the halftone representation of FIG. 19. The diagonals of colorant clusters named "cW" represent the fluorescent white colorant made of the overlays of the fluorescent blue, yellow-green and red clusters of dispersed dot halftones. The diagonals of dispersed colorant clusters named "cM" represent the fluorescent magenta colorant made of the overlays of the fluorescent blue and red clusters of dispersed dot halftones. The diagonals of dispersed colorant clusters named "cR" represent the fluorescent red colorant made of the fluorescent red clusters of dispersed fluorescent red ink halftones. Clusters of dispersed dots are laid out diagonally. Each diagonal line of clusters represents a specific colorant. In the case of juxtaposed screen elements incorporating up to 3 different colorants, the diagonals appear in the sequence of a first colorant (e.g cW 2711), a second colorant (cR 2712), a third colorant (cM 2713), and again the same sequence of first (cW 2714), second and third colorants, and so on, repeated as long as there is no change in the selected colorants.

Within each cluster of dispersed dots of a given ink layer separation, e.g. the red colorant "cR", there are small "white" non-active areas representing pixels (e.g. 2702, 2703) that are part of the boundaries between the "black" active pixels. The "black" active pixels (or equivalently pixel segments) specify the places of (a) gravure cells to be engraved onto the rotogravure cylinder, (b) ink accepting areas on the offset plate, (c) locations on the photoconductor that will attract toner particles or (d) printed locations on paper (inkjet). FIG. 12 shows in detail the blue, yellow-green and red ink-specific juxtaposed clusters of dispersed dot halftones that have "black" active pixels showing for rotogravure the cells to be engraved, surrounded by "white" non-active pixels representing the cell boundaries that will be formed onto the rotogravure cylinder.

An ink halftone separation is transferred into a device used for printing, such as a rotogravure cylinder, a gravure plate, an offset plate, a photoconductor or a flexography plate. Once transferred into such a device, the ink halftone separation is also called "device halftone separation".

An engraved rotogravure cylinder, for example obtained by laser engraving, is associated to a given ink halftone separation. Its engraved small cells have the same layout as the black pixels shown in FIG. 12. The fluorescent blue color separation cylinder has the layout shown in 1201, the yellow-green color separation cylinder the layout shown in 1202 and the red color separation cylinder the layout shown in 1203, for the colorants shown in FIG. 10, enlargement 1011. Most gravure cells engraved according to the present disclosure are thin (1 pixel width) and have a lengthy shape, of 1 to several pixels, see examples in FIG. 12 and FIG. 14. Neighboring engraved cells may touch each other, either by their corners, or by a part of their side. FIG. 28 shows junctions (hatched) between neighboring cells. In that example, touching sides are one pixel long.

A fluorescent color halftone image printed by rotogravure with cylinders engraved according to the present disclosure, with clusters of densely spaced small cells laid out along diagonals shows a succession of diagonally laid out clusters, with neighboring cluster diagonals being associated to different colorants, as shown in FIG. 11, 1100.

In regions whose colors do not much vary (e.g. FIG. 10, 1010, small square), juxtaposed dispersed dot ink separations show successions of clusters of densely spaced pixel segments (e.g. 1214, 1215, 1216) having similar sizes along sections of a same diagonal, e.g. the clusters shown in the diagonal 1212 (FIG. 12). Along another diagonal 1213, the successions of clusters of densely spaced dispersed segments have also a similar size. Their size however generally differs from the size of the clusters located on the neighboring diagonal. This can be verified by comparing the cluster size in diagonal 1212 with the cluster size in diagonal 1213.

The characterization of the juxtaposed dispersed dot halftones on rotogravure cylinders is also valid for characterizing offset plates: the ink accepting areas of the offset plates have the same layout as the juxtaposed dispersed dot ink halftone separations shown in FIG. 12. In respect to electrophotography, the latent images produced on the photoconductor have also the same layout as the juxtaposed dispersed dot ink halftone separations shown in FIG. 12. The juxtaposed dispersed dot halftones also enable characterizing a print obtained by inkjet.

Applications of Fluorescent Juxtaposed Dispersed Dot Halftone Imaging

A main application is the creation of invisible color images viewable under UV light for the protection of security documents such as bank notes, passports, ID cards, fiscal stamps, entry tickets, travel documents, checks, vouchers or valuable business documents. A further application is the protection of valuable articles such as software packages and medical drugs. Further applications may combine decorative and protective aspects such as wine bottles, perfumes, watches, fashion articles, vehicles and clothes. Further applications are mainly decorative such as commercial art, publicity displays, fashion articles, and night life, where digitally produced fluorescent images viewed under UV illumination in the dark have a strong appealing effect.

Authentication of Documents and Valuable Articles

There are several means of authenticating valuable items such as documents and valuable articles. One possibility is to verify that the fluorescent prints obtained with the juxtaposed dispersed dot ink halftone separations are correctly reproduced, exhibit a large color gamut and have correct achromatic gray and white tones. Further authenticating techniques consist in comparing the precomputed ink halftone separations located in the memory of a computer and possibly shown on a display with the fluorescent halftones emitted from the fluorescent print under UV light. This comparison can be carried out at two levels, at the ink halftone separation level and/or at the colorant level. At the ink halftone separation level, the emitted halftones are acquired by an RGB camera, e.g. the camera of a smartphone, yielding a captured "fluorescent" RGB image. In case that the emitted fluorescent halftones acquired by the RGB camera comprise ink halftones that are similar to the halftones present in the ink halftone separation, the corresponding valuable item is considered to be authentic. If this is not the case, the corresponding valuable item is to be considered as a counterfeit. To carry out this comparison, one can compare separately each channel of the captured fluorescent RGB image with its corresponding ink halftone separation. In case they are similar, the valuable item is authentic and if they are dissimilar, the valuable item is a counterfeit. Similarity can also be checked by verifying the presence of characteristic features both in the ink halftone separation and in the emitted fluorescent halftones captured by the RGB camera. The list of characteristic features is given below.

One may also authenticate valuable items by creating in the memory of a computer a simulation of the fluorescent print. This is carried out by creating colorant halftones comprising for three inks the superposition of the three corresponding halftone ink separations as shown in FIG. 19. Since the colors of the colorants and of the underlying inks are known, the colorant halftones can be displayed as a colorant halftone color image, similar to the one of FIG. 10. This colorant halftone color image can be compared with the "fluorescent" RGB image that results from the acquisition of the emitted halftones. If the colorant halftone color image is similar to that fluorescent RGB image, the valuable item is authentic. If this is not the case, the valuable item is a counterfeit. Such a comparison can be carried out with by a computer program which computes a distance metric between the two color images. If the distance metric between the colorant halftone color image and the fluorescent" RGB image is small, the valuable item is considered to be authentic. If the distance metric is large, the valuable item is considered to a counterfeit.

A further means of authenticating a valuable item consists in comparing original ink halftone separations formed by clusters of juxtaposed densely spaced pixel segments located in a computer's memory with corresponding device halftone separations present on the device which is part of the printing system with which the valuable item is printed. Such devices comprise rotogravure cylinders, gravure plates, offset plates and flexography plates. In case the device halftone separations are similar to the original ink halftone separations, the corresponding valuable item is considered to be authentic and in case they are dissimilar, the corresponding valuable item is considered to be a counterfeit. Similarity is tested by checking on both the original ink halftone separations and on the corresponding device halftone separations the presence of features selected from the list of characteristic features.

List of Characteristic Features (a) Clusters of dispersed pixel segments belonging to different colorants do not overlap because, by construction, juxtaposed clustered dots belonging to different colorants cannot overlap. The clusters of densely spaced dispersed pixel segments are circumscribed by the corresponding juxtaposed clustered dots. Compare the clustered dots of FIG. 11 bottom and the clusters of dispersed dots of FIG. 12.

(b) On areas without important color variation, successive clusters of dispersed segments located on a same diagonal belong to the same colorant.

(c) Clusters of dispersed segments located in neighboring diagonals belong to different colorants, see the simulated juxtaposed dispersed dots of FIG. 11, 1100.

(d) On areas without significant color variations, successive clusters of dispersed segments located within a same diagonal have similar sizes, e.g. the magenta clusters in row 1102*b* of FIG. 11.

(e) Clusters of dispersed segments are separated by an inactive unprinted space, see the "black" space between the clusters of juxtaposed dispersed dots present in colorant halftone 1100 or the space (FIG. 27, 2701) between the juxtaposed dispersed colorant dots (e.g. 2720).

(f) Within the clusters, the dispersed segments are surrounded by inactive pixels providing them a border (e.g. 2702, 2703), at least along some part of their boundary. On a real print, due to ink spreading, these thin borders may not be present. But they are present on supports used for printing, such as the rotogravure cylinder, the offset plate, or the flexography plate.

(g) Juxtaposed dispersed dot halftoning is preferably embodied by random threshold error diffusion. Random threshold error diffusion ensures that different instances of similar juxtaposed clusters of pixel segments have different layouts. The presence of different layouts for the same amount of ink or the same amount of a colorant can be checked on clusters of dispersed segments located on the same diagonal, e.g. in FIGS. 12, 1214, 1215 and 1216 or in FIG. 19, diagonal 1902*b*.

Some characteristic features may be invisible at some locations of an ink halftone separation. For example, if the surface coverages of one of the colorants is very large, no other colorant is present, and the unprinted space is very small, then there is only a single colorant per screen element. In that specific case, features (a), (c) and (e) are not applicable. As another example, consider an ink halftone separation transferred onto a device for printing (e.g. a rotogravure cylinder or an offset plate). Since the resulting device halftone separation is associated with a single ink only, features (a), (c) and (e) are not applicable. As a further example, on a juxtaposed dispersed dot print, due to ink spreading, the details within the clusters of densely spaced pixel segments are not distinguishable. In that case, features (f) and (g) are not applicable. Therefore, the similarity between original ink halftone separation and device halftone separation or actual print must be checked with the appropriate features on areas of the original ink halftone separation and on areas of the corresponding device halftone separation or actual print, where these features can really appear.

Extension of Juxtaposed Dispersed Dot Halftoning to Printing Technologies Beyond Rotogravure In flexographic printing, the ink is deposited on top of the raised printing elements located on a cylinder plate. These raised elements transfer the ink into the substrate (paper, cardboard, packaging material, fabrics). These raised elements need to be surrounded by non-raised boundaries.

Therefore, the same procedure that is used to create gravure cells for rotogravure printing can also be used for creating the raised elements on the flexographic cylinder plate. The black pixels shown in FIG. 2 represent in this case the raised elements that are inked by the anilox roller which transfers the ink from the ink chamber to the printing plate incorporating the raised elements.

In pad transfer printing, a gravure master plate contains engraved cells that are similar to the engraved cells present on a rotogravure cylinder. The pad surface is lowered and captures the ink present in the engraved cells of the master plate. The inked pad surface is then lowered onto the object to be printed. The ink on the surface of the pad is transferred to that object. Since the cells of the master plate are similar to gravure cells present in gravure printing, juxtaposed dispersed dot halftoning also applies to pad transfer printing.

Juxtaposed dispersed dot halftoning is also applicable in order to create ink halftone separations for offset printing. The dispersed halftone ink level reduction factors associated to the ink halftones enable controlling the density or, equivalently, the amount and areas of horizontal, vertical and diagonal pixel segments located within the clusters of dispersed dots. This enables tuning the intensity of the emitted fluorescence of each fluorescent offset ink. In addition, due to the independent layout of the overlaid ink halftones forming the colorants, small local positioning inaccuracies of the ink halftone separations do not induce significant fluorescent color shifts. Juxtaposed clusters of dispersed dot halftones such as those shown in FIGS. 2, 12, 14 and 28 can directly be used to create the plate for offset printing. Therefore, juxtaposed dispersed dot halftoning is also appropriate for offset printing of fluorescent images viewable under UV light.

Inkjet also benefits from juxtaposed dispersed dot halftoning. In the prior art, the white colorant is obtained by an exact superposition of the three fluorescent inks, with the possibility of adapting their respective density by reducing the inkjet pixel dot size (U.S. Pat. No. 8,085,438, col. 3, line 2). Juxtaposed dispersed dot halftoning with freely chosen ink-dependent ink level reduction factors offers much more flexibility for tuning the density of the individual ink layers compared with the printer-dependent reduction of pixel dot size.

The arguments stated above in respect to offset and inkjet printing also apply to electrophotography, especially liquid toner electrophotography. For electrophotography, the dispersed halftone ink level reduction factors also enable controlling the density of individual toners, thereby tuning their emitted fluorescent intensity. Juxtaposed dispersed dot halftones such as those shown in FIGS. 2, 12, 14 and 28 can directly be used to create the latent image on the photoconductor.

A further use case concerns the deposition of various materials, e.g. materials dissolved in a solution, viscous materials, biomaterials, conducting materials, non-conducting materials, magnetic materials, specularly reflecting materials, iridescent materials, plastic materials, opaque inks, metallic inks. Such liquids, inks or viscous materials can be solidified by evaporation, by lowering or increasing the temperature, by UV radiation, by visible light radiation, by heating or by chemical reactions. Such liquids or viscous materials can be deposited on a substrate by gravure printing, by pad printing or by ink-jet. Therefore, the presently disclosed juxtaposed dispersed dot halftoning method is applicable. In the case that different instances of such materials need to be placed on a substrate, they are generally not allowed to be superposed and therefore juxtaposed dispersed dot halftoning is recommended.

In this case, each instance of such a material is assimilated to a single ink colorant. Both rotogravure printing and ink-jet printing are especially appropriate for printing with such materials.

Printing Fluorescent Color Images by Juxtaposed Dispersed Dot Halftoning for the Prevention of Counterfeits As explained in U.S. Pat. No. 8,085,438, column 25, line 27, juxtaposed halftoning allows printing with a larger fluorescent gamut compared with conventional clustered dot printing techniques that require superposed ink layers. A large gamut cannot be achieved without advanced equipment to measure the emission spectra of the colorants and without the software operable for performing fluorescent color prediction, gamut mapping and creation of a juxtaposed screen element library. Juxtaposed dispersed dot halftoning extends juxtaposed halftoning to rotogravure printers and improves offset, inkjet and electrophotography printing of fluorescent images. The resulting gamut is also very large. With such a large gamut, the presence under UV light of striking colorful fluorescent images indicates that the corresponding document or product is authentic. Potential counterfeiters having no access to such software modules would not be able to produce faithful fluorescent color reproductions.

In addition, rotogravure prints obtained with juxtaposed dispersed dot halftoning show that individual colorants are printed side by side and are surrounded by unprinted space (black space in FIG. 11, 1100). This proves that the corresponding documents or valuable articles are authentic. The presence of the juxtaposed dispersed dot halftones (FIG. 12, FIG. 14) on the gravure cylinders indicates the presence of a rotogravure print setup operable for printing documents or valuable articles incorporating counterfeit prevention features.

Furthermore, the presence of non-standard fluorescent inks such as the yellow-green ink (FIG. 15, 1502) makes color separation with standard software packages a very difficult task. One may even further strengthen the protection against counterfeits by also replacing the fluorescent red ink with a non-standard fluorescent orange ink. The proposed fluorescent color reproduction framework described in the present disclosure supports the reproduction with such non-standard fluorescent inks thanks to its spectral emission measurements, its spectral prediction of fluorescent prints, its gamut mapping and its juxtaposed dispersed dot halftoning method.

Advantages of Juxtaposed Dispersed Dot Halftoning

1. Juxtaposed dispersed dot halftoning extends the prior art juxtaposed clustered dot halftoning method to rotogravure printing, flexography printing, improved offset printing, improved inkjet printing, and improved electrophotography. Juxtaposed dispersed dot halftoning fulfills the requirements of having side by side clusters of dispersed colorant dots separated by unprinted space. Clusters of dispersed dots are embodied by clusters of densely spaced small segments, each one partially or fully surrounded by an unprinted boundary. For rotogravure printing, these small segments indicate the locations of the cells to be engraved on the rotogravure cylinder. For offset printing, they are imaged onto the offset plate and constitute the ink accepting locations. For electrophotography, the juxtaposed dispersed dot halftone separations are transferred as latent images onto the photoconductor. The small segments forming these juxtaposed clusters of dispersed dots constitute their active portions. These active portions attract the oppositely charged fluorescent toner particles. These fluorescent toner particles are then transferred to either an intermediate cylinder with an elastic blanket or directly onto the substrate (paper).

For rotogravure printing, engraving is carried out by one of the available engraving techniques such as laser lithography followed by chemical etching, direct laser engraving or mechanical engraving. Rotogravure printing is known to have a number of advantages: capability of printing high print volumes, capability of printing several print runs with the same cylinders, very high printing speed, and consistent print quality. Electrophotography is complementary to rotogravure printing. It allows printing individualized documents or small volumes due to the fact that successively printed pages can be different from one page to the next. Providing the means to print by rotogravure, by electrophotography and by inkjet color images that are visible only under UV opens new perspectives for protecting documents and valuable articles against counterfeits. Thanks to electrophotography or inkjet, personalized document images can be issued as images that are visible only under UV light, such as the photograph of the holder of a passport.

2. No Quenching: one of the problems of printing with fluorescent inks is the presence of quenching, when two fluorescent colorants are superposed. Quenching has the effect of reducing the light emitted by fluorescence. To avoid the non-linear behavior of quenching, juxtaposed halftoning ensures that dots of different colorants are printed side by side and that in most cases unprinted space surrounds the colorant dots (see FIG. 11, 1100: unprinted space is black under UV light).

3. Creation of new colorants by the overlay of ink halftones: The first set of colorants that are used for printing invisible color images viewable under UV light are the single inks themselves, i.e. in the present example the fluorescent blue, fluorescent red and the fluorescent yellow-green inks. A second set of fluorescent colorants is formed by overlays of fluorescent ink halftones. The fluorescent magenta colorant is formed by the overlay of the fluorescent blue and the red ink halftones and the white colorant is formed by the overlay of the fluorescent blue, red and yellow-green ink halftones. When overlaying several fluorescent ink halftones to create an additional colorant, quenching has no negative effect, since the produced colorant has its own measured emission spectrum and thus behaves like an additional ink. Therefore, the creation of new colorants by overlays of several fluorescent ink halftones is allowed and is compatible with the fluorescent emission color prediction model (Equation (16)). Thanks to the ink-dependent ink level reduction factor used for dispersed dot halftoning, the amount (or the density) of a fluorescent ink within a given colorant can be optimized to yield a desired color, for example a perfectly achromatic white color.

4. Advantages of juxtaposed dispersed dot halftoning embodied by random threshold error diffusion: the halftones created for the ink layers contributing to new colorants are obtained by juxtaposed dispersed dot halftoning, preferably implemented by error-diffusion with random thresholds. Random threshold error diffusion ensures that each cluster of dispersed dots has a different layout of pixels with no ink, one ink, two inks, and three inks. The overlay of randomly placed pixels with no ink, one ink, two inks, and three inks does not induce undesired local moirés. Small local positioning inaccuracies of the dispersed ink halftones do not modify the color of the printed halftone. (see the diagonal rows of FIG. 19, where each cluster of dispersed dots has a different layout). Due to the fact that the produced dispersed halftone segments have similar sizes, gravure cells of similar sizes are engraved on the rotogravure cylinder, ink accepting areas of similar sizes are imaged onto the offset plate or toner attracting areas of similar sizes are created on the photoconductor. This leads to a color reproduction of high stability and repeatability. In addition, excellent gray tones are obtained thanks to ink level reduction factors specific for each ink and possibly depending on the surface coverages of the inks.

5. Balanced Fading Thanks to Juxtaposed Dispersed Dot Halftoning

When left a long time under strong daylight illumination, substrates printed with invisible fluorescent inks form prints that may undergo a fading process. In classical clustered dot halftones, printed ink dots do partially overlap. In the parts that are overlapping, fading will primarily affect the ink layer that is on top of the overlapped dot part. The remaining ink layers will continue to fluorescence. This leads to a modification of the hue of the fluorescent color emitted by that halftone. For example, in case of clustered dot ink separation halftone layers printed in successive passes of fluorescent blue ink, fluorescent yellow-green ink and fluorescent red ink, the fading process will in priority attenuate the top ink halftone layer, in the present example, the fluorescent red ink. Therefore, in case of overlapping mutually rotated clustered dot halftones, the corresponding fluorescent halftone will shift from its original color.

In contrast, with juxtaposed dispersed dot halftoning, the layout of the clusters of dispersed ink segments ensures that these clusters are surrounded by unprinted non-active space. Therefore, one colorant is clearly separated from another colorant. In addition, for colorants composed of two or three overlaid ink halftone layers halftoned according to random threshold error diffusion, only a fraction of the ink pixels forming that colorant are really superposed. Another fraction of ink pixels are laid out side by side, see FIG. 18 for the overlay of two ink layers, FIG. 19 for the overlay of three ink layers and FIG. 27 for an enlargement of a part of FIG. 19. The fact that much less pixels are superposed compared with classical clustered dot halftoning enables creating fluorescent prints where the fading process reduces the overall lightness, but does not change significantly the original hue of that halftone. Therefore, for all the considered fluorescent color printing technologies, juxtaposed dispersed dot halftoning provides a balanced fluorescent halftone fading behavior, which exhibits less hue shift than classical clustered dot halftones.

6. Extensibility of juxtaposed dispersed dot halftoning to more than 3 colorants: As shown in FIGS. 24A, 24B, 24C and 25, the juxtaposed dispersed dot halftoning can be extended to 4 or more colorants by simply forming a screen element with additional cells, as shown in FIG. 24A for the case of 4 cells. The ratios of the surface coverages of the colorants enables placing the successive cells (FIG. 24B). By downscaling the area of the resulting cell rectangles according to the sum of the surface coverages of the inks, one obtains the screen element with the correctly sized colorant cells (FIG. 24C). The produced screen element tiles the plane by displacing each successive row of screen elements by one initial screen cell of width a (FIG. 25).

7. Same Prepress Software for Rotogravure, Offset Printing, Inkjet Printing and Electrophotography The fact that the same software can be used for the color reproduction on a rotogravure printer, on an offset press, on an inkjet printer and on an electrophotography printing device is an important advantage. A customer needs to buy only one software package for two, three or four types of printing systems. In addition, using the same software relying on juxtaposed dispersed dot halftoning ensures that prints obtained by rotogravure, by offset, by inkjet or by electrophotography will look similar. This is important for establishing a framework for the prevention and the detection of counterfeits.

The invention claimed is:

1. A method for creating an authenticable color halftone print made of juxtaposed clusters of dispersed dots comprising the steps of:
creating a screen element with juxtaposed clustered dots, the areas of said juxtaposed clustered dots being determined by surface coverages of colorants present within the screen element;
generating the juxtaposed clusters of dispersed dots through a dispersed dot halftoning procedure applied to the juxtaposed clustered dots, said juxtaposed clusters of dispersed dots formed by sets of densely spaced segments, partly or fully enclosed by non-printable boundaries within areas of said juxtaposed clustered dots;
tuning the dispersed dot halftoning procedure by defining ink level reduction factors specifying surface ratios of segments within said sets of densely spaced segments;
printing the juxtaposed clusters of dispersed dots by transferring them onto a color printer;
wherein:
for a fluorescent color reproduction workflow, the ink level reduction factors are optimized to obtain under UV light fluorescent achromatic gray and white colors,
authentication is performed on the authenticable color halftone print by verifying that characteristic features of said juxtaposed clusters of dispersed dots are present.

2. The method of claim 1, wherein
the dispersed dot halftoning procedure is an error-diffusion procedure,
said error-diffusion procedure is applied with random thresholds, thereby ensuring that each instance of the sets of densely spaced segments has a different layout,
the different layouts, superposed for creating multi-ink colorants, prevent local moirés and ensure that positioning inaccuracies do not induce color deviations.

3. The method of claim 1, where locations and areas of the segments specify positions and areas at which:
for rotogravure printing, a rotogravure cylinder is engraved,
for pad printing, a pad gravure plate is engraved,
for offset printing, the segments are imaged onto the offset plate,
for electrophotography, the segments are imaged onto the photoconductor,
for flexography, raised elements are present on the flexography printing plate, and
for inkjet, ink is deposited;
where in case of said rotogravure printing, engravings of the rotogravure cylinder carry inks that are transferred onto a substrate of the authenticable color halftone print.

4. The method of claim 1, where creating the screen element with the juxtaposed clustered dots comprises the steps of:
(a) selecting the colorants to be placed within the screen element;
(b) laying out the screen element;
(c) calculating ratios of surface coverages of the colorants;
(d) according to the ratios of surface coverages, dimensioning colorant cells associated to the colorants; and
(e) scaling the colorant cells by an area reduction factor corresponding to a summation of the surface coverages of the colorants;
where steps (c), (d) and (e) create non-printable space surrounding the juxtaposed clustered dots.

5. The method of claim 1, where creating the authenticable color halftone print is part of a fluorescent color reproduction workflow for creating, within an output halftone space, ink halftone separations comprising fluorescent inks, said workflow comprising the steps of
(a) selecting an input color image;
(b) scanning the output halftone space pixel by pixel and scanline by scanline;
(c) determining a corresponding location within the selected input color image;
(d) obtaining an image color at the corresponding location;
(e) accessing a previously established table that maps the image color to the surface coverages of the colorants formed by the fluorescent inks and by superpositions of the fluorescent inks;
(f) obtaining the surface coverages of the colorants from the previously established table;
(g) with the surface coverages of the colorants, accessing a screen element library and obtaining a juxtaposed dispersed dot halftone;
(h) reading from the juxtaposed dispersed dot halftone identifiers of the fluorescent inks; and
(i) copying the identifiers of the fluorescent inks onto the ink halftone separations;
wherein:
the ink halftone separations contain the sets of densely spaced segments indicating positions and areas of the authenticable color halftone print where the fluorescent inks are deposited and
the authenticable color halftone print formed by the fluorescent inks visible only under UV light is difficult to counterfeit.

6. An authenticable color halftone print produced by a printing device, the print comprising as characteristic features ink halftones forming juxtaposed clusters of densely spaced segments, each segment partly or fully surrounded by unprinted boundaries, where printing is performed by sending the juxtaposed clusters of densely spaced segments to the printing device, and wherein:
the juxtaposed clusters of densely spaced segments are surrounded by unprinted space,
the juxtaposed clusters of densely spaced segments are laid out obliquely along diagonals,
the diagonals of the juxtaposed clusters of densely spaced segments belonging to different colorants have a same oblique orientation,
the juxtaposed clusters of densely spaced segments belonging to the different colorants do not overlap, and
authentication is performed with an RGB camera capturing an image of said ink halftones and verifying on smooth areas of the image whether said characteristic features are present.

7. The authenticable color halftone print of claim 6 printed by a device selected from a set of rotogravure printer, pad printer, offset printer, flexographic printer, electrophotographic printer and ink-jet printer, wherein:

the ink halftones exhibit the juxtaposed clusters of densely spaced segments that fluoresce under UV illumination.

8. The authenticable color halftone print of claim 6 further comprises:
wherein
the printing device is a rotogravure printing machine incorporating rotogravure cylinders;
the juxtaposed clusters of densely spaced segments appear on the rotogravure cylinders engraved as clusters of densely spaced rotogravure cells;
individual rotogravure cells are partly or fully surrounded by cell borders;
the clusters of densely spaced rotogravure cells are surrounded by areas without rotogravure cells, and
the clusters of densely spaced rotogravure cells are laid out along diagonals all having a same orientation.

9. The authenticable color halftone print of claim 8 further comprises:
wherein the rotogravure printing machine is operable for printing with a material selected from the set of liquids, viscous materials, solutions, suspensions, gravure inks, fluorescent invisible inks, daylight fluorescent inks, opaque inks, metallic inks, iridescent inks, biomaterials, conducting materials, isolating materials, magnetic materials, specular materials, and plastic materials.

10. A computer-based system for creating a color halftone print that is authenticable, comprising:
a central processing unit,
a memory,
a mass storage unit,
a network interface,
software executed by the central processing unit comprising:
(i) a first module creating in said memory, screen elements with diagonally oriented juxtaposed clustered dots dimensioned by surface coverages of colorants present within the screen elements,
(ii) a second module creating in said memory, diagonally oriented juxtaposed clusters of dispersed dots through a dispersed dot half toning procedure applied to the diagonally oriented juxtaposed clustered dots,
(iii) a third module transferring halftones made of the diagonally oriented juxtaposed clusters of dispersed dots to a printer and printing the halftones to obtain the color halftone print with following specific characteristic features:
the diagonally oriented juxtaposed clusters of dispersed dots are surrounded by unprinted space,
the diagonally oriented juxtaposed clusters of dispersed dots belonging to different colorants have a same diagonal orientation, and
the diagonally oriented juxtaposed clusters of dispersed dots do not overlap;
wherein authentication of the color halftone print comprises:
capturing an image of the color halftone print using a smartphone with an RGB camera;
verifying the presence of the specific characteristic features; and
based on the verifying, acknowledging the authenticity of the color halftone print when the specific characteristic features are present.

11. The computer-based system for creating a color halftone print of claim 10, wherein:
(a) the diagonally juxtaposed clusters of dispersed dots generated by the dispersed dot halftoning procedure are formed by ink-specific clusters of densely spaced segments, each segment being partly or fully surrounded by non-printable boundaries;
(b) the densely spaced segments specify positions and areas which
for rotogravure printing are engraved onto a rotogravure cylinder,
for pad printing are engraved onto a gravure plate,
for offset printing are imaged onto an offset plate,
for electrophotography are imaged onto a photoconductor,
for flexography specify positions and areas of raised elements and
for inkjet specify where ink is jetted onto a substrate of the color halftone print;
(c) the dispersed dot halftoning procedure is adjustable by ink level reduction factors specifying surface ratios of active printable space within the ink-specific clusters of densely spaced segments; and
(d) for a fluorescent color reproduction workflow, the ink level reduction factors are specific for each ink layer and are optimized to obtain printed fluorescent achromatic gray and white colors.

12. The computer-based system for creating a color halftone print of claim 11, wherein:
the dispersed dot halftoning procedure is an error diffusion procedure with thresholds that are randomly distributed,
the error diffusion procedure creates instances of the ink-specific clusters of densely spaced segments that have different layouts,
overlaying a plurality of the ink-specific clusters of densely spaced segments that have the different layouts preventing undesired local moirés, and in a case of positioning inaccuracies, preventing induced color deviations,
said overlaying provides in a case of a fluorescent color reproduction workflow,
a fading behavior with less hue shifts when compared to ink halftones generated by clustered dot half toning.

* * * * *